United States Patent
Ghent

(10) Patent No.: US 9,959,367 B2
(45) Date of Patent: *May 1, 2018

(54) THIRD PARTY CENTRALIZED DATA HUB SYSTEM PROVIDING SHARED ACCESS TO THIRD PARTY QUESTIONNAIRES, THIRD PARTY RESPONSES, AND OTHER THIRD PARTY DATA

(71) Applicant: IHS MARKIT KY3P, LLC, New York, NY (US)

(72) Inventor: Gina S. Ghent, New York, NY (US)

(73) Assignee: IHS MARKIT KY3P, LLC, New York, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/690,493

(22) Filed: Aug. 30, 2017

(65) Prior Publication Data

US 2017/0364604 A1    Dec. 21, 2017

Related U.S. Application Data

(62) Division of application No. 14/878,379, filed on Oct. 8, 2015, now Pat. No. 9,779,178.

(Continued)

(51) Int. Cl.
*G06F 21/00*    (2013.01)
*G06F 17/30*    (2006.01)
(Continued)

(52) U.S. Cl.
CPC ... *G06F 17/30958* (2013.01); *G06Q 10/0635* (2013.01); *G06Q 10/10* (2013.01)

(58) Field of Classification Search
USPC .................... 726/25; 705/7.28, 35
See application file for complete search history.

(56) References Cited

U.S. PATENT DOCUMENTS 7,930,228 B1 *   4/2011  Hawkins ............ G06Q 10/0635
                                                  705/35
2006/0089861 A1  4/2006  King et al.
(Continued)

FOREIGN PATENT DOCUMENTS

WO    2007126320 A1    11/2007

OTHER PUBLICATIONS

International Search Report for International Application No. PCT/US2015/059163, dated Jan. 31, 2016.

*Primary Examiner* — Jason Lee
(74) *Attorney, Agent, or Firm* — Marsch Fischmann & Breyfogle LLP; Kent A. Lembke

(57) ABSTRACT

A system for providing a third party centralized data hub. The system includes a server storing a database of sets of third party data, and the system includes a third party risk management module on the server maintaining the third party data. The system includes a first set of client devices communicatively linked with the server over a digital communications network and operable by data providers to provide and modify one of the sets of third party data. The system includes a second set of client devices linked with the server and operable by data consumers to access a subset of the sets of third party data. During operations, the risk management module monitors the third party data, identifies a modification, by one of the data providers, of one of the sets of third party data, and automatically generates and transmits an alert to the second set of client devices.

13 Claims, 26 Drawing Sheets

Related U.S. Application Data

(60) Provisional application No. 62/078,770, filed on Nov. 12, 2014.

(51) Int. Cl.
*G06Q 10/10* (2012.01)
*G06Q 10/06* (2012.01)

(56) References Cited

U.S. PATENT DOCUMENTS

| | | | |
|---|---|---|---|
| 2009/0164276 A1* | 6/2009 | Sass .................. | G06Q 10/00 705/7.28 |
| 2011/0178836 A1* | 7/2011 | Seefeld ............... | G06Q 10/06 705/7.28 |
| 2016/0232465 A1* | 8/2016 | Kurtz .................. | G06Q 40/08 |

* cited by examiner

1100

TPRM DATA HUB - THIRD PARTY USER

TASKS AND PROPOSED VIEWS

REGISTRATION   ACCOUNT ACTIVATION

| INITIAL INVITE EMAIL |
| 3 STEP PROCESS |
| FORMS TO COLLECT INFORMATION |

| SET PASSWORD |

TERMS OF USE

| TERMS OF USE |

- FILL OUT USER DETAILS
- FILL OUT COMPANY DETAILS
- INVITE COLLEAGUES

---

CLIENTS ( OR CUSTOMERS)

CLIENTS 

| MY CLIENTS |
| MY CONTACTS |
| PENDING INVITATIONS TO CONNECT |
| PENDING QUESTIONNAIRE |
| REQUESTS |

- VIEW ALL BANKS YOU'RE CONNECTED WITH
- VIEW PENDING INVITATIONS OR CONNECTIONS
- LOOK FOR A KEY CONTACT AT A BANK

BANK PROFILE

| BASIC COMPANY INFO |
| KEY CONTACTS |
| DESCRIPTION |
| |
| IN NETWORK ONLY |
| PRODUCTS USED |
| RELATIONSHIP INFORMATION |
| HISTORY/ACTIVITY WITH ME |
| PENDING COMMUNICATION |
| QUESTIONNAIRES |
| REMOVE CONNECTION |

- FIND OUT MORE ABOUT A BANK
- INVITE TO CONNECT
- FIND A POINT OF CONTACT TO ASK QUESTIONS

IN NETWORK
- SEE WHICH OF YOUR PRODUCTS A BANK USES
- EXPLORE YOUR RELATIONSHIP WITH A THIRD PARTY
- SEE WHAT COMMUNICATION IS STILL PENDING
- INITIATE REMEDIATION PROCESS

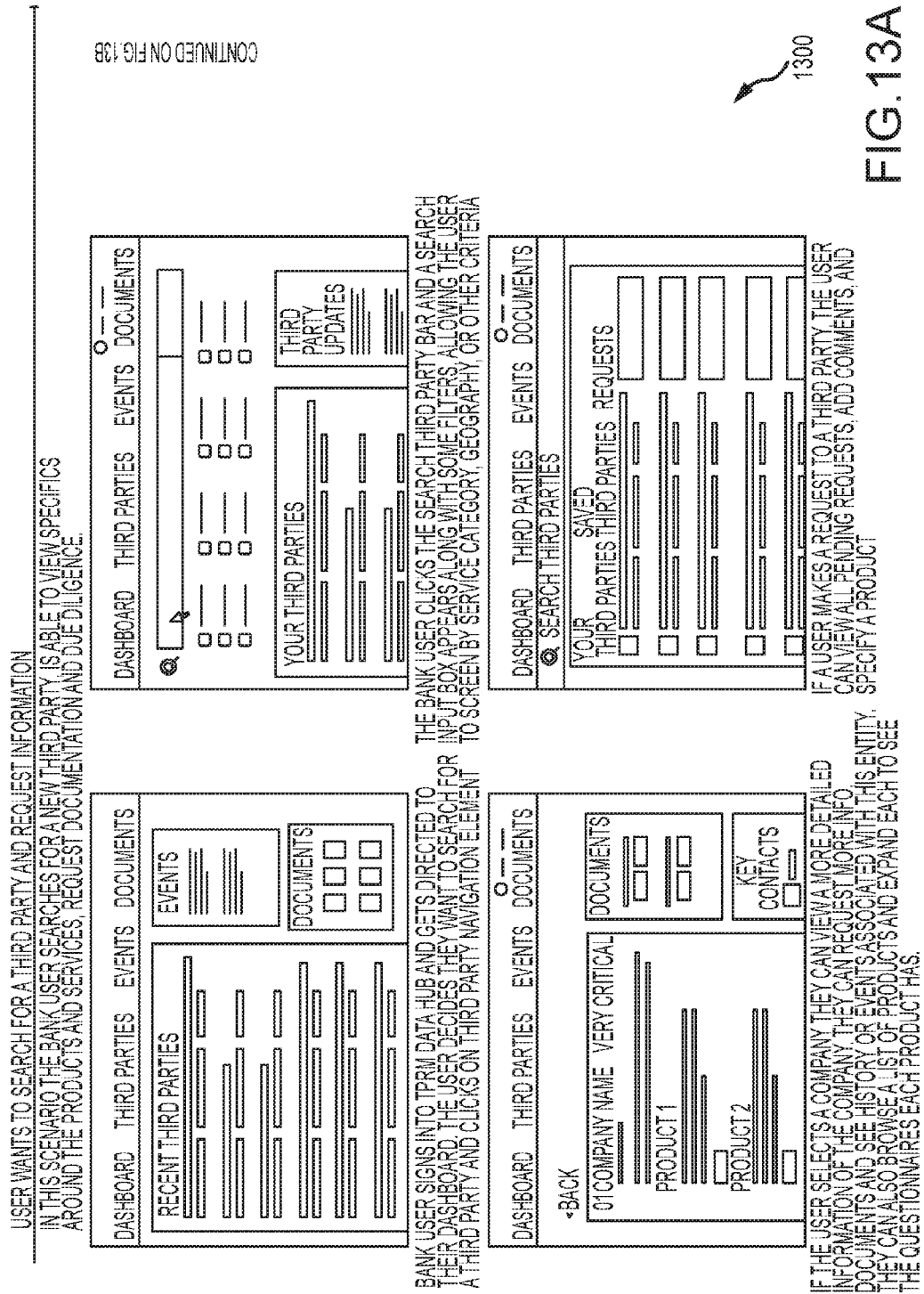

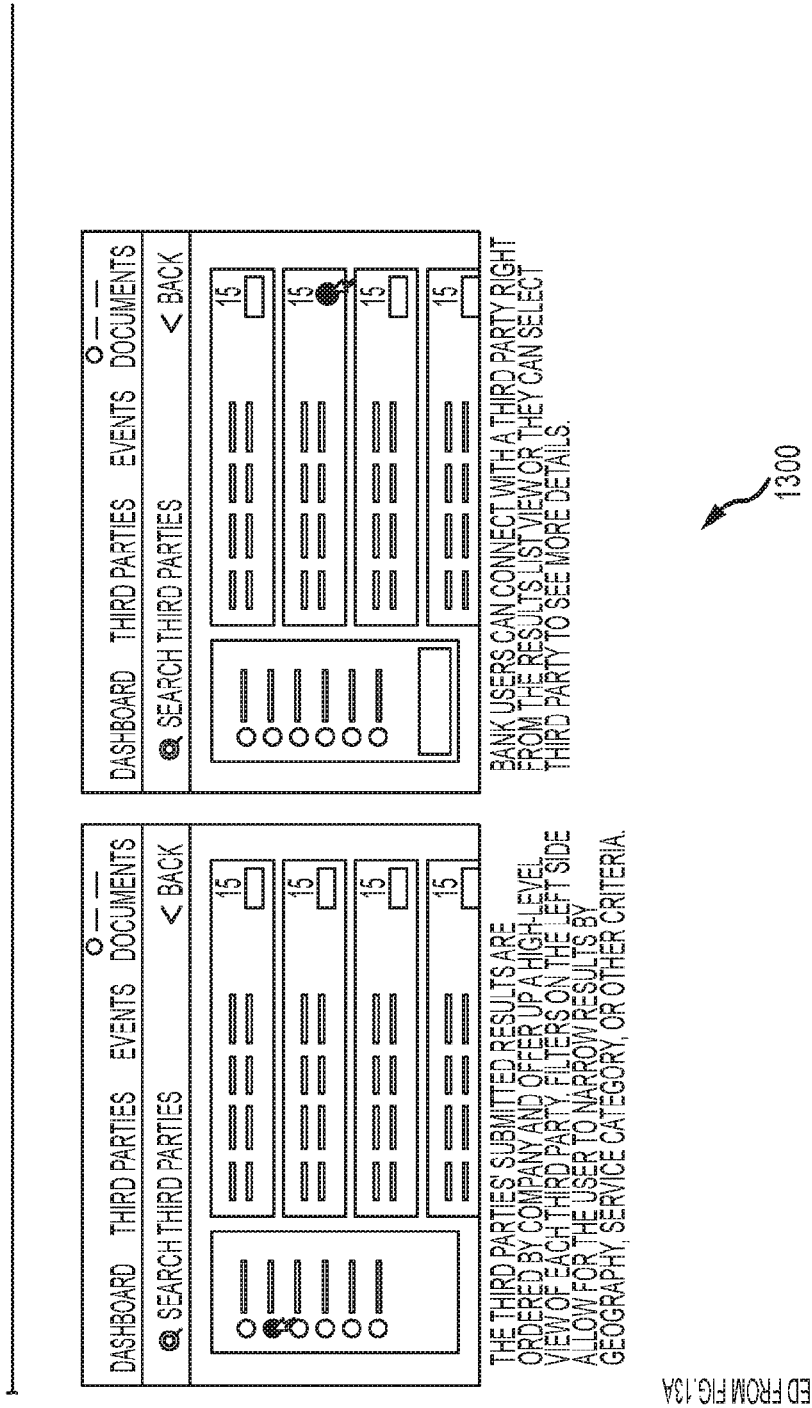

THIRD PARTY CENTRALIZED DATA HUB SYSTEM PROVIDING SHARED ACCESS TO THIRD PARTY QUESTIONNAIRES, THIRD PARTY RESPONSES, AND OTHER THIRD PARTY DATA

CROSS-REFERENCE TO RELATED APPLICATIONS

This application is a Divisional of U.S. patent application Ser. No. 14/878,379, filed Oct. 8, 2015, which claims the benefit of U.S. Provisional Application No. 62/078,770, filed Nov. 12, 2014, both of which are incorporated herein by reference in their entireties.

BACKGROUND

1. Field of the Description

This description is generally directed toward systems and methods for managing communications between numerous contracting entities (including, but not limited to, banks and other financial institutions or "consumers" of information) and service and/or product providers ("providers" of information), and, more particularly, systems and methods for providing a centralized third party data hub that may store third party data (or third party risk management information) such as answers to a third party/vendor questionnaire that may be used in a risk management process, e.g., as part of third-party oversight ("TPO") and such as external audit documentation. For purposes herein, third-party relationships include activities that involve outsourcing products and services and that involve use of independent consultants, networking arrangements, merchant payment processing services, services provided by affiliates and subsidiaries, joint ventures, and other business arrangements where the bank has an ongoing relationship or may have responsibility for the associated records.

2. Relevant Background.

There are numerous situations in commerce and other settings where large sets of data and information need to be collected from a set of entities or third parties and processed by another entity. For example, it is common for businesses and other entities that are working with numerous third-party service or product providers (sometimes referred to as "providers" or "third party data providers" herein) to gather sets of data for their respective applicable products and services via questionnaires and process the data as part of a bid, planning, and/or due diligence process prior to contracting with the third party. As a result, each business entity may receive numerous (i.e., tens to hundreds to thousands of) completed questionnaires, and, conversely, each third party may have to complete a new questionnaire for every entity they wish to provide their services and/or products. The questionnaires are typically digitally completed via spreadsheets or other forms and submitted online or over a network (e.g., the Internet or other digital communications network), and the tasks of requesting, providing, and processing this data is time-consuming, repetitive, and inefficient for both the data consumer and data provider.

To better explain the issues addressed by the systems and methods described herein, it may be useful to discuss a particular environment or application in which large amounts of data need to be collected from third parties and processed by contracting entities (or other data consumers). Banks and other financial institutions (collectively labeled "banks" and banks and other entities using and accessing third party data are as a group labeled "data consumers") are required by government institutions to perform third party risk management in a particular manner based on numerous laws and regulations. A bank is responsible for assessing and managing risks associated with third-party relationships as a bank's use of a third party does not diminish their responsibility to ensure an activity is performed in a safe and sound manner and in compliance with applicable laws. The need for an effective risk management process and/or TPO has grown as banks continue to increase the number and complexity of relationships with both foreign and domestic third parties including outsourcing bank functions such as tax, legal, audit, or information technology (IT) operations, relying on third parties to engage directly with customers, and working with third parties to address deficiencies in bank operations or to provide compliance with laws or regulations.

It is generally expected by governments that a bank will have risk management processes that are commensurate with the level of risk and complexity of its third party relationships and the bank's organizational structures. Hence, more comprehensive and rigorous oversight (or TPO) may be provided for third party relationships that involve more critical activities (e.g., significant bank functions such as payments, clearing, settlements, and custody, significant shared services such as IT, or activities that could cause a bank to face significant risk if the third party fails to meet expectations, could have significant customer impacts, require significant investment in resources to implement the third-party relationship and manage the risk, or could have a major impact on bank operations if the bank has to find an alternate third party).

An effective third-party risk management TPO process should follow a continuous life cycle for all relationships, and it may incorporate the following phases: (1) planning which includes developing a plan to manage the relationship; (2) due diligence and third-party selection which may include conducting a review of a potential third party before signing a contract so as to understand and control the risks posed by the relationship; (3) contract negotiation which may include developing a contract that clearly defines expectations and responsibilities of the third party; (4) ongoing monitoring including monitoring of the third-party relationship once the contract is in place; and (5) termination which may include developing a contingency plan to ensure the bank can transition the activities to another third party or to in-house sources or discontinue the activities. Throughout the lifecycle, the bank should also perform oversight and accountability, documentation and reporting, and independent reviews.

Presently, in the United States and worldwide, regulators are concerned that the quality of risk management over third-party relationships may not be keeping pace with the level of risk and complexity of these relationships. The contracting entities (i.e., banks in this example) attempt to gather large amounts of third party management information using third-party or vendor questionnaires (e.g., spreadsheets). The current process was created over a number of years, has not served to most effectively assess and mitigate risk, and has not kept pace with technological innovations such that it is inefficient and costly for all parties involved as each bank or even each TPO function or each segment of the third party management lifecycle (such as planning, due diligence and third-party selection, and ongoing monitoring) will send one or more questionnaires to each of its potential and existing third parties. As a result, with the current bilateral model, a third party is forced to complete multiple questionnaires that include the same or similar questions and which include the same or similar answers. Often, the bank will have difficulty determining who to contact for completion of the third party questionnaire and, typically, the bank may only have a single contact at a third party rather than having a contact for a particular portion of the third party providing a desired service or product. This leads to delayed responses to the bank and delays the critical aspect of timely third party ongoing monitoring that a bank performs.

In existing third party risk management systems, there is a significant duplication of effort for both the bank and the third party. Many third parties have multiple business entities, subsidiaries, and products (collectively "business units"), which can make it difficult for banks to track their third parties, and the business units may provide third party management information separately to the bank, which can cause inefficiencies and confusion during risk management processes and TPO. Tracking large numbers of third parties (e.g., many banks will have hundreds to tens of thousands of third parties, and this number is further multiplied by the number of products and services provided by the third party) to collect and process third party management information has proven to be very difficult if not nearly impossible without the availability of an automated system. From the third parties' point of view, third parties have become increasingly challenged and frustrated as they are required to provide similar, if not the same, information to their many customers. Their requests for information and resulting costs to provide such have skyrocketed and have actually served to impede their business and revenue recognition. Increasing demand for information of a much larger scope is leading to longer response times from the third parties and, in some cases, to substandard responses from the third parties, and this may actually lead to increased or undetected risks associated with third-party relationships rather than to high-quality responses and decreased risks.

Hence, there remains a need for improved systems and methods of managing third parties. Preferably, such improved methods and systems would provide an automated way to identify third parties and their business units and gather third party risk management information (e.g., answers to third party questionnaires or requests for external audit documentation) and would also facilitate communications between contracting entities (e.g., banks and other business or non-business entities that contract with third parties for services and/or products) and third parties.

SUMMARY

The inventor recognized that to improve third party risk management (e.g., TPO performed as part of risk management associated with third parties) it would be useful to provide a centralized repository (or a third party risk management data hub (or the "TPRM data hub")) to gather and store the third party risk management information. The TPRM data hub is used to store base or standard third party questionnaires (or otherwise providing interfaces to gather various types of third party management information, including but not limited to, non-standard, bilateral information) and make these available to third parties (e.g., any third party offering services or goods to the contracting entities or "customers") to review, complete, and permission this information.

The third parties may each provide their third party risk management information by completing the standard or base third party questionnaires. This "one truth" or single set of third party information can then be permission-base provided to the multiple contracting entities that may work with each of the third parties. The contracting entities can also provide additional or "delta" questions that act to supplement the base or standard third party questionnaire (e.g., request additional information to satisfy firm-specific, nation or state-specific, or other regulations), and this delta set of third party information may be made available to the particular requesting contracting entity. In this way, the third parties can easily provide their base/standard set of third party information to many contracting entities while also providing additional third party information to those contracting entities requiring it for their TPO or risk management processes.

It is believed that the third party risk management data hub system (or the TPRM data hub system) and method described herein will help address the fact that regulatory oversight is becoming more complex, e.g., multiple government agencies in multiple jurisdictions may require compliance and at higher standards than in the past. The TPRM data hub system and method also address abundant process inefficiencies associated with existing decentralized models that neither standardize nor provide a common location for third party risk management information or lifecycle functions. These prior models can actually serve to increase risk, with delayed response and lack of efficient means to provide quality responses, lead to higher costs for both the customer (bank, for example) and the third party, and increase the risk of regulatory non-compliance. To this end, the TPRM data hub system and method provides a controlled, centralized workflow platform that mitigates and/or contains risk while also controlling and even, in many cases, decreasing costs associated with third party risk management (e.g., with TPO).

To properly manage risk, firms need to efficiently and accurately identify the multiple products and services of third parties. A third party identification number or "3PIN" is created or generated by the TPRM data hub for each product or service provided by the third party. Further, a 3PIN may be generated for each third party. In this way, a bank or other contracting entity (or data consumer) is able to obtain third party risk management information not just for the overall third party or company but for the portion of the third party/company that is providing a service or product of particular interest to the bank or contracting entity. The 3PIN allows data consumers to find risk information for the correct entity of the corporate structure (e.g., subsidiaries of a corporation or company) as well as for the correct product or service of a company (e.g., service or product-providing firm or portion of that firm). The answers to standard and delta questions in a questionnaire may vary within a single third party, and the answers/third party risk management information would be linked to each 3PIN (and, hence, be retrievable by a bank/contracting entity during third party risk management processes). This aspect of the 3PIN allows a bank/contracting entity (or data consumer or customer) to be able to communicate directly with the portion of a third party entity that is responsible for providing a particular service or product (e.g., contact the IT service providing entity in the country of interest and so on rather than merely contacting the corporate headquarters for the third party). Further, the questionnaire and delta questions may vary for each of these services, products, or subdivisions/subentities such as based on the type of service, the level of criticality of the service, and so on.

More particularly, a system is described herein for providing a third party centralized data hub. The system includes a server storing a database of sets of third party data, and the system also includes a third party risk management module provided on the server maintaining and controlling access to the database of the sets of third party data. Further, the system includes a first set of client devices communicatively linked with the server over a digital communications network and operable by data providers to provide and modify one of the sets of third party data via the digital communications network. Additionally, the system includes a second set of client devices communicatively linked with the server over the digital communications network and operable by a plurality of data consumers to access a subset of the sets of third party data. During operations of the system, the third party risk management module monitors the sets of the third party data, identifies a modification, by one of the data providers, of one of the sets of third party data in the subset of the sets of third party data, and, when the modification is identified, automatically generates and transmits an alert, based on the modification, to the second set of client devices operable by the data consumer.

In some implementations, the alert includes a portion of the modified one of the sets of third party data including the modification. Generally, each of the sets of third party data includes data entries associated with a set of data fields common to all of the sets of third party data. In this regard, the modification that is identified/monitored may include a change to one of the data entries for one of the data fields (e.g., be associated with a significant event for the third party data provider). In such cases, the set of data fields is data entry fields of a third party due diligence questionnaire. Also, the third party risk management module may receive a data input request from the data consumer and, in response, update the third party due diligence questionnaire to include a data field associated with the data input request. Further, the third party risk management module may perform a risk assessment by processing the data entries and, when a predefined change in results of the risk assessment is identified for one of the data providers, automatically generating a risk alert that is transmitted over the digital communications network to the second set of client devices operable by the data consumer. In some cases, the subset of the sets of third party data accessed by each of the data consumers differs for at least some of the data consumers (e.g., differing banks or other contracting entities may wish to monitor different sets of third parties) and is defined by the third party risk management module based on user input provided from each of the data consumers via operation of the second set of client devices.

BRIEF DESCRIPTION OF THE DRAWINGS

FIGS. 13A-15B illustrate potential user workflows for a bank user searching for third parties, for a bank user responding to an event, and a third party user responding to an event;

DETAILED DESCRIPTION

Figure 1:
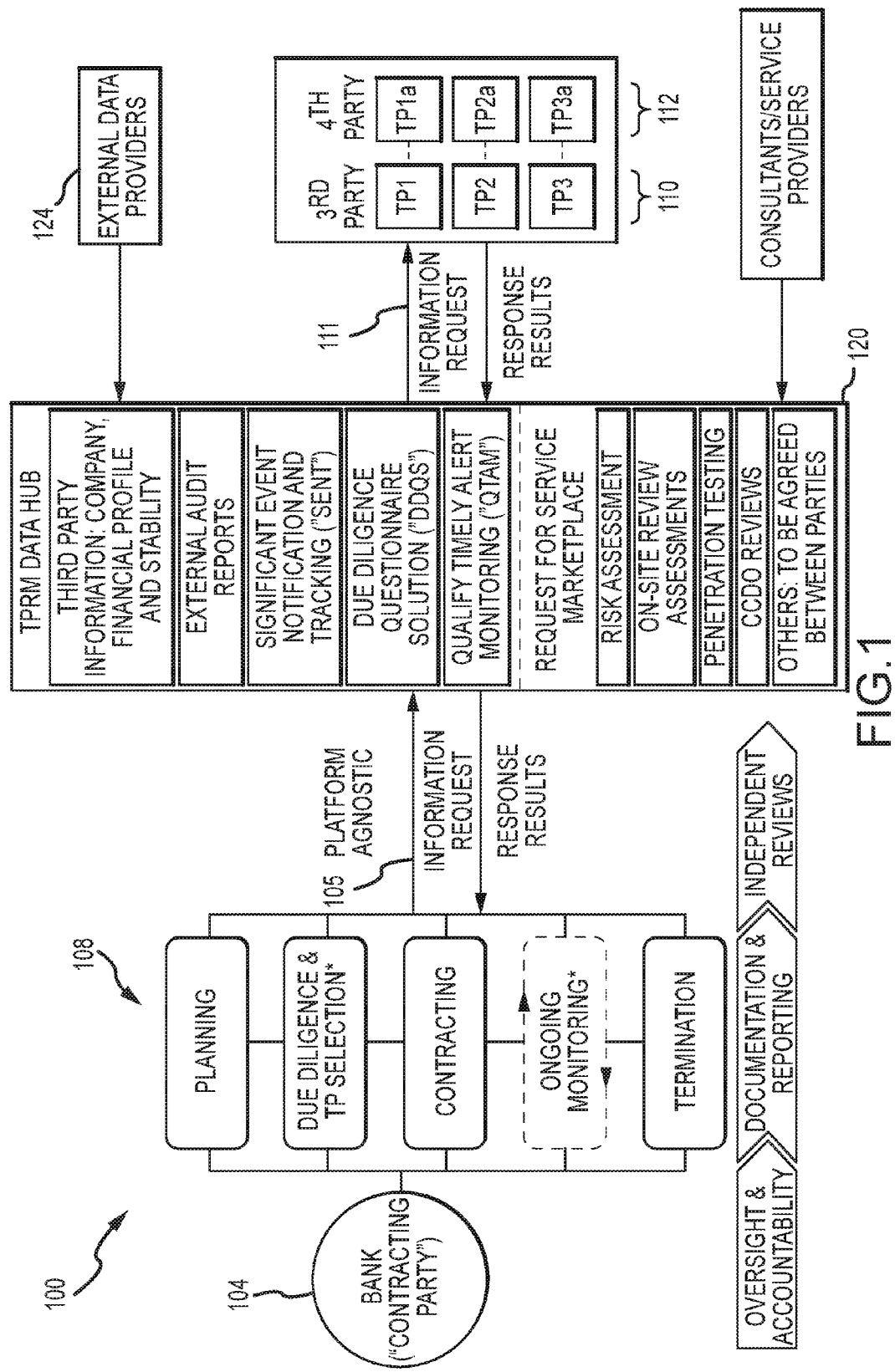
FIG. 1 illustrates a functional block or schematic view of a computer system or network configured with a third party risk management data hub (e.g., a centralized data engine or module provided on a central server or server accessible by bank and third party computing and/or network devices) of the present description.

Briefly, the present description is directed towards methods and systems for implementing a third party risk management data hub. In part, the third party risk management data hub provides a central repository or database (e.g., via a central server(s)) that is used to store standard (or base) third party questionnaires as well as modified questionnaires that include additional delta question sets, to serve the questionnaires to gather third party risk management information, and to store responses to these questionnaires by third parties (e.g., to store third party risk management information or to populate the third party information database with third party-provided responses). The delta question sets may be specifically asked and/or provided by the customers (or contracting parties/entities such as banks) and may be particular to the third party, to the type of third party (e.g., the level of criticality (or tier) of the third party relationship), or to the service or product being provided by the third party. The third party risk management data hub further may function to provide customers access to the third party risk management information or to serve input information to the customers with a mapping of responses to questions/data requests provided by each of these customers (e.g., map base and delta questions and their answers to questions provided by each customer).

Many of the examples provided herein relate to the customers being banks (or other financial institutions) and the third-party entities providing services or products to banks. However, the third party risk management data hub system and method may be used in many other environments such as in the health care industry (e.g., with banks being replaced by hospitals/health care providers), and, hence, the present description and following claims are not limited to use in the financial industry but are useful in nearly any setting where it is desirable to share sets of data between a first set of entities (i.e., customers or contracting entities or consumers of data) and a second set of entities (i.e., third party entities or providers of data). Note again, that the phrase "third parties" is intended to be a relatively broad term including any third party such as brokers when broker due diligence must be performed by a bank (or other contracting party).

The inventor determined that there existed a need for a more efficient process related to third-party oversight (TPO). This need can be met wholly or in part through a network or computer system with a third party risk management data hub (sometimes labeled a TPRM data hub or a TPRM data hub engine herein). The TPRM data hub provides a centralized location for efficiently and accurately assessing and managing the risks associated with third-party relationships. To this end, the TPRM data hub may take the form of a shared services model with a specific focus related to the most inefficient process related to the TPO risk management process, i.e., the third party questionnaire used to gather third party information used in risk management or analysis. One of the issues being addressed by the systems and methods taught herein is the inefficiencies related to the TPO process, and, specifically, the lack of a centralized location that permits the sharing of third-party information, which may be related to the third party due diligence questionnaire process and also facilitates other aspects of third party risk management.

In the past, third-party "standardized" due diligence questionnaires typically were obtained by a customer or contracting party, and then modified as desired prior to being transmitted by the customer to the third party. This resulted in third parties receiving many differing "standard" questionnaires from their many customers. The systems and methods taught in this description, such as the due diligence questionnaire solution (DDQS) process, permit a questionnaire workflow and centralized routing of third party-provided responses or third party risk management information. This leverages a "standard" or "protocol" due diligence questionnaire, which may be agreed to by a set of customers (e.g., a subset of the banks or other customers that may use the standard questionnaire). Each of the customers or contracting entities can then bilaterally add delta questions as applicable to their needs (e.g., to their current regulatory needs for third party risk management). The modified questionnaire may then be algorithmically processed by the third party risk management centralized data hub (or an engine/module provided in the TPRM data hub) to include service level and/or criticality aspects.

The customer may then proactively request the TPRM data hub to communicate the questionnaire to one or more third parties (or communicate a request that the third party complete the modified questionnaire). In other cases, a third party may proactively access the modified questionnaire to populate the central database with their third party risk management information (their responses to the modified questionnaire). The questions that correspond with the standard/protocol questionnaire need only be completed once by the third party such that they may only have to provide answers to the delta questions for each of their customers. The third party may provide full access permission to all customers or may identify a subset of the customers (e.g., particular banks) that may view and/or use the third party-provided responses (or third party risk management information) for their risk assessment and other purposes.

A critical theme or aspect that had been lacking in the industry prior to the concepts described herein was a "one-and-done until refresh required" one-to-many multilateral concept. Further, existing third party management processes did not allow or enable sharing of third party risk management information or sharing standard/protocol third party questionnaire schemas. Previously, third parties received separate requests for third party risk management information from each of their customers who are trying to meet regulatory requirements related to due diligence and ongoing monitoring. In contrast, the systems and methods using the TPRM data hub concepts provide third parties the ability to efficiently provide their input or information to their customers and allow the customers (e.g., banks and other contracting entities) to, in turn, accurately assess risk associated with third-party relationships in a timely manner and with an assessment of the highest quality, which are two of the critical aspects of third party risk management.

FIG. 1 illustrates a functional block or schematic view of a computer system or network 100 configured with a third party centralized data hub (or data hub system) 120 (e.g., an engine or module provided on a central server) of the present description. The system 100 is adapted to provide a third party risk management lifecycle solution that allows a contracting entity/party (e.g., a bank 104) to communicate in an efficient manner with a plurality of third party entities (e.g., service or product providers) 110. One bank 104 is shown in system 100, but a more typical system 100 would include numerous banks or other contracting entities 104. In practice, the bank 104 may be trying to manage its third party relationships or relationships with vendors 110, and, to this end, the bank 104 may include one or more sub-entities or clients 108 that need access to the same or differing sets of vendor management information that are provided by the vendors 110.

In the system 100, a third party centralized data hub (or TPRM data hub) 120 is communicatively linked with the bank 104 or its sub-entities/clients 108 as shown at 105 and also with the third parties 110 as shown at 111. The third party risk management centralized data hub 120 may include one or more servers that run software/programs to provide the functions of the TPRM data hub 120 including centralized, full or selected lifecycle capabilities supporting third party risk management. The bank 104, clients 108, and third parties 110 may include computing devices that are linked in a wired or wireless manner as shown with arrows 105, 111 to the TPRM data hub (or a server(s) providing the TPRM data hub) 120 via a digital communication network(s) such as the Internet or similar well-known networks including the ability to upload and download data in various technological ways, for example by using application programming interfaces (APIs), spreadsheet up/downloads, and graphical user interface (GUI) direct interface. The TPRM data hub 120 may be used to provide web site or web page-type access to its stored data (e.g., third party questionnaires, third party-provided answers to questions in such third party questionnaires (or third party risk management information), and the like) to the client devices 104, 108, 110 (or the bank 104, 108, 110). Typically, a monitor of each device 104, 108, 110 is used to display a graphical user interface (GUI) that prompts users of the devices 104, 108, 110 to make selections, enter data, and otherwise interact with the TPRM data hub 120. The TPRM data hub 120 may also receive data from external data providers 124 to facilitate the third party risk management processes described herein during operation of the system 100.

The TPRM data hub 120 provides a one-stop lifecycle shop that provides third party risk management data from the third parties 110, which can serve as the basis for decision making and risk assessment/acceptance by the bank 104 while also addressing third party "fatigue." The fatigue is immensely reduced as the third parties 110 only have to complete questions provided in a protocol or standard questionnaire created, stored, and served by the TPRM data hub 120 once (and then periodically as part of a "refresh" process) rather than for each contracting party or bank they service or supply.

During operations of the system 100 and the TPRM data hub 120, the TPRM data hub 120 provides third party due diligence questionnaire protocol/standard and delta questions (questionnaire) workflow. The concept of a protocol related to third party questionnaires involves adhering parties (such as the bank 104 or other contracting parties (not shown in FIG. 1)) agreeing on a standard or base questionnaire for each type or level of criticality third party in the system 100 (e.g., a standard third party questionnaire may be created for each of a plurality of criticality levels each with differing sets of questions that need to be answered to populate a third party risk management database(s), which is made available to the bank 104 for third party risk management including risk analysis).

The TPRM data hub 120 further supports a "delta" workflow in which the bank 104 or its sub-entities/client devices 108 (e.g., planning, due diligence and third-party selection, contracting, ongoing monitoring or TPO, termination, and or other functions performed by the bank 104) may supplement or modify the standard third party questionnaire by providing additional questions/requests for third party risk management information/data from the third parties 110. This "delta" set of questions can then be stored and served by the TPRM data hub 120 to one or more of the third parties 110 and used to further populate the third party risk management database (not shown in FIG. 1 but often stored in memory/data storage on the server providing TPRM data hub 120 or on a server accessible by the TPRM data hub 120). As shown, fourth parties 112 may also provide data for the TPRM data hub 120 (e.g., directly or via the third parties 110), and the data hub 120 may also communicate with consultants and/or service providers 114 to obtain input for the data hub 120 (and this data may be considered as separate risk processing data or a part of the third party data stored and processed by the TPRM data hub 120).

Additionally, the TPRM data hub 120 may be configured to offer mapping of questions in the TPRM data hub's standard questionnaire(s) to a present set of questions defined by a bank 104 or one of its sub-entities/functional client elements 108 (e.g., a bank 104 may have a set of third party questionnaires for each tier of its third parties (each level of criticality of its third parties)). The questions of such bank-provided questionnaires may be mapped by a mapping engine/module of the TPRM data hub 120 such that the bank 104 can continue to use its own third party questionnaires to manage its third parties (e.g., "Question 3 of a particular bank questionnaire is mapped to Question 5 of the standard third party questionnaire" or the answers/responses may be used to complete or populate the bank's questionnaire as part of the mapping processes). Questions that cannot be mapped may be provided as a delta questionnaire to appropriate third parties.

Figure 2:
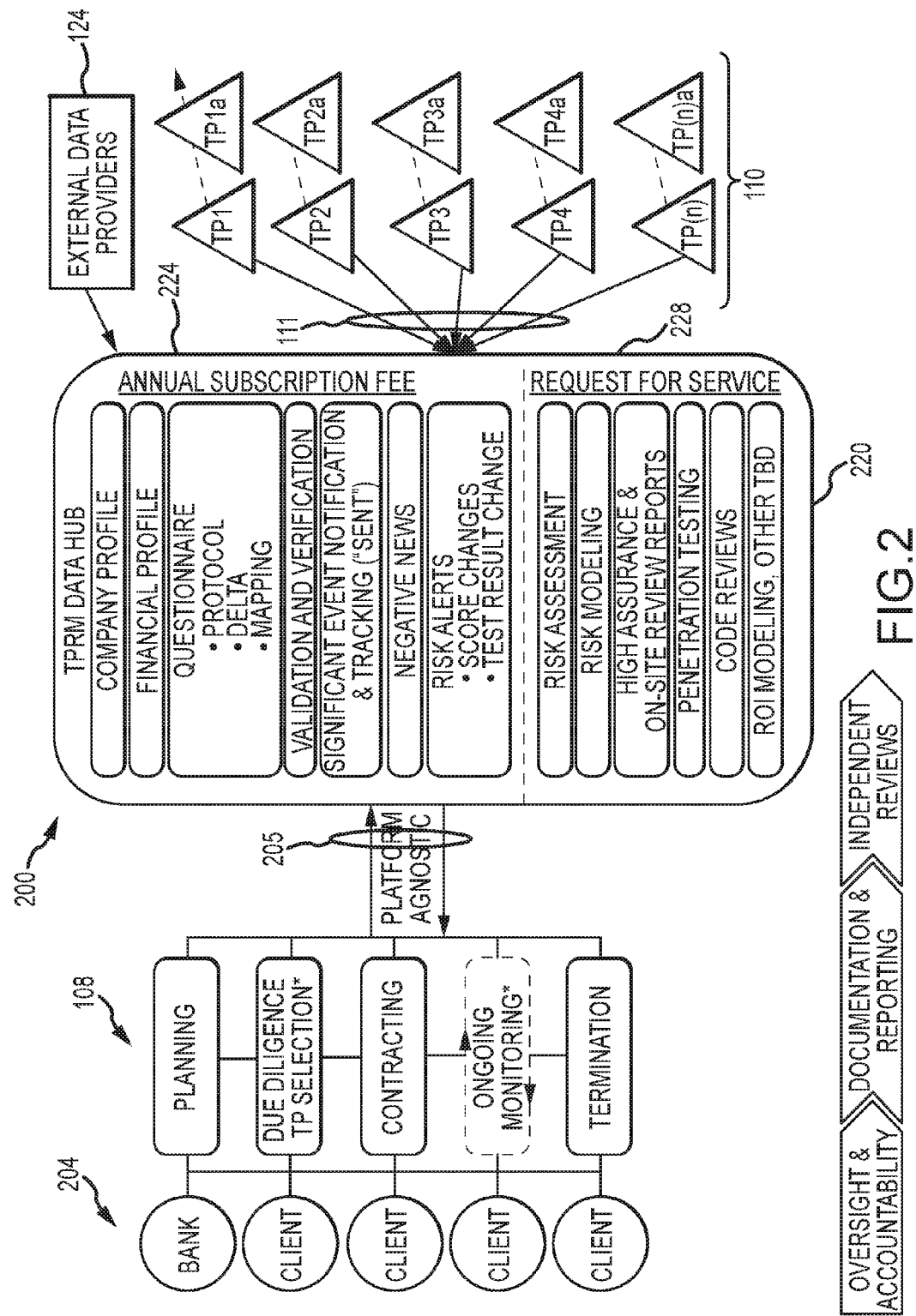
FIG. 2 illustrates a functional block or schematic view of computer system or network similar to that shown in FIG. 1 with a third party risk management data hub (TPRM data hub) provided with its functionalities (e.g., programs, engines, modules, or the like) shown in more detail.

The system 100 may be configured to include a bilateral "Request-for-Service" (RFS) and multi-party "Request-for-Shared-Services" (RFSS) marketplace portion as shown in the system 200 of FIG. 2. The inclusion of the Request-for Service portion of the TPRM data hub 120 allows banks or third parties the ability to request services from service providers for one or more add-on services/functions such as high assurance risk assessments, onsite reviews, risk modeling, and the like. Parties may also collectively request services from a service provider (e.g., a bank requiring an on-site assessment of a third party) via RF SS and, therefore, decrease costs substantially for both the bank 104 and the third party 110 and permit an efficient process versus the current repetitive and costly process. The system 100 with the TPRM data hub 120 provides centralized information sharing of both standard third party questionnaires and also of third party-provided responses to such questionnaires (e.g., third party risk management information). The system 100 is advantageous as it provides economies of scale.

The TPRM data hub 120 may create and manage a centralized third party database, which can be a "golden" source for licenses, approved, and shared information (among two or more banks or contracting entities 104) related to the third parties 110 (and/or fourth parties 112) including questionnaires and responses and validated information. As shown, the data hub 120 may collect, store, update, maintain, and provide access to vendor information (e.g., company name, financial profile, and stability) and external audit reports. The data hub 120 may also provide significant event notification and tracking (or a "SENT" service). Also, as shown, the data hub 120 may be adapted to provide a due diligence questionnaire solution or DDQS module or suite that builds and serves a protocol and delta questionnaire that may be served to third and fourth parties 110, 112 and answers received may be stored in the data hub 120 (and access (on a permission-based basis) may be provided to the data consumers 104). The data hub 120 may also include a quality module(s) to provide question and/or answer validation and/or verification and that may provide timely alert monitoring (shown as a QTAM module in FIG. 1).

The TPRM data hub 120 may be adapted further to provide ongoing monitoring of the third party risk management data and to provide alerts (e.g., alerts when a risk score changes (to banks 104 and/or third parties 110), when a risk score drops below an acceptable or preset limit (to banks 104 and/or third parties 110), when a questionnaire has been added or modified (alert to third parties 110), and the like). As shown, this may be provided via risk assessment, on-site review assessments, penetration testing, code review, and/or other services in a service marketplace. The system 100 with its TPRM data hub 120 provides: (1) centralization which increases third party risk management efficiency such as by ensuring the highest regulatory standards are met under the most efficient process; (2) compliance and risk reduction in a risk mitigating environment; and (3) cost reduction, e.g., for banks the solution provided by system 100 will drop costs (e.g., by 30 to 40 percent or more) with decreased touch points and opportunity costs.

FIG. 2 illustrates a functional block or schematic view of computer system or network 200 similar to that shown in FIG. 1 with a centralized third party risk management data hub (or TPRM data hub) 220 shown with its functionalities (e.g., programs, engines, modules, or the like) shown in more detail than in FIG. 1 (with similar elements/components having like numbers and not discussed again in detail at this point). As shown, the system 200 includes third parties 110 (and fourth parties labeled as TPAa-TP(n)a) providing their third party data (which may include fourth party data) via communications links 111 to the TPRM data hub 220. A plurality of banks/clients 204 may access this shared third party risk management information via a platform agnostic communication link 205 to the TPRM data hub 220.

As shown, the TPRM data hub 220 may be configured with a core or first portion/engine 224 and a supplemental or second portion/engine 228. The core engine 224 may act to collect and store, for each third party 110, a set of third party risk management information that may include the third party's company and financial profiles. Further, the core engine 224 may act to manage creation and serving (and, in response, populating a third party risk management information database (the "golden" database)) questionnaires (e.g., a protocol/standard questionnaire for each criticality level/tier, a delta questionnaire (or a modified version of the protocol questionnaire), and the like). Further, the core engine 224 may act to provide mapping of the questionnaires provided by the bank/clients 204 (or their functional entities 108) to the protocol and delta questionnaires. The core engine 224 may provide validation and verification of the third party information provided by the third parties 110. Further, the core engine 224 may provide additional functions such as through a SENT (significant event notification and tracking) module. The core engine 224 or another component of the TPRM data hub 220 may provide quality timely alert monitoring (QTAM) to provide timely news and information related to a bank's third parties 110, with negative news being shown as part of the data hub service provided under an annual subscription fee section of the data hub 220.

The second portion/engine 228 of the TPRM data hub 220 may provide the ability to request additional functions/services (e.g., services that a bank 204 may ask for via a Request-for-Service to a service provider). These added functions may include risk assessment, risk modeling, high assurance and on-site review reports, risk alerts (e.g., upon score changes, upon test result changes, and upon occurrence of negative media), penetration testing, code reviews, return on investment (ROI) modeling, and the like.

The SENT module may function based on the following: (a) target industry-wide significant events; (b) coordinate efforts by banks/contracting entities to obtain information from third parties upon discovery of a significant event or allow banks and other consumers/customers to pose questions and solicit answers for a pre-emptive event (such as compliance requests for information or system down time conformance); (c) banks/contracting entities have agreed upon protocol questions for third party questionnaire(s), which may be relatively short; (d) the banks/contracting entities have the ability to add delta questions; (e) the bank/contracting entities may also, via the TPRM data hub 220, request and track remediation of issues identified processing the third party risk management data provided through the third party questionnaire; and (f) near real-time and aggregated data and analytics can be provided by the TPRM data hub 220 (e.g., with dashboards and other GUI/reports and including questionnaire responses and remediation status). SENT may also permit: (a) a bank to create, submit, and process their own bilaterally-driven, specifically-deemed events that require notification to its third parties and potentially resulting in requests for information (the bilateral SENT model versus the shared SENT model as initially outlined above); and (b) third parties to proactively post their firm-specific information related to a particular event and release such to all their customer banks.

The TPRM data hub 220 including the SENT module provides a value proposition due to: (a) risk reduction from standardization of information, shorter turnaround times, and timely information; (b) elimination of duplicative due diligence and assessments; (c) reduction of resource stress associated with unplanned events at both the banks/contracting entities and third parties; (d) allowing banks and third parties to focus on solving for events rather than on information gathering; and (e) serving as a proactive and efficient means for third parties to provide third party risk management information to facilitate third party management. As with FIG. 1, although not shown, fourth parties may also provide data for the TPRM data hub 220 (e.g., directly or via the third parties 110), and the data hub 220 may also communicate with consultants and/or service providers to obtain input for the data hub 220 (and this data may be considers as separate risk processing data or a part of the third party data stored and processed by the TPRM data hub 220).

Figure 3:
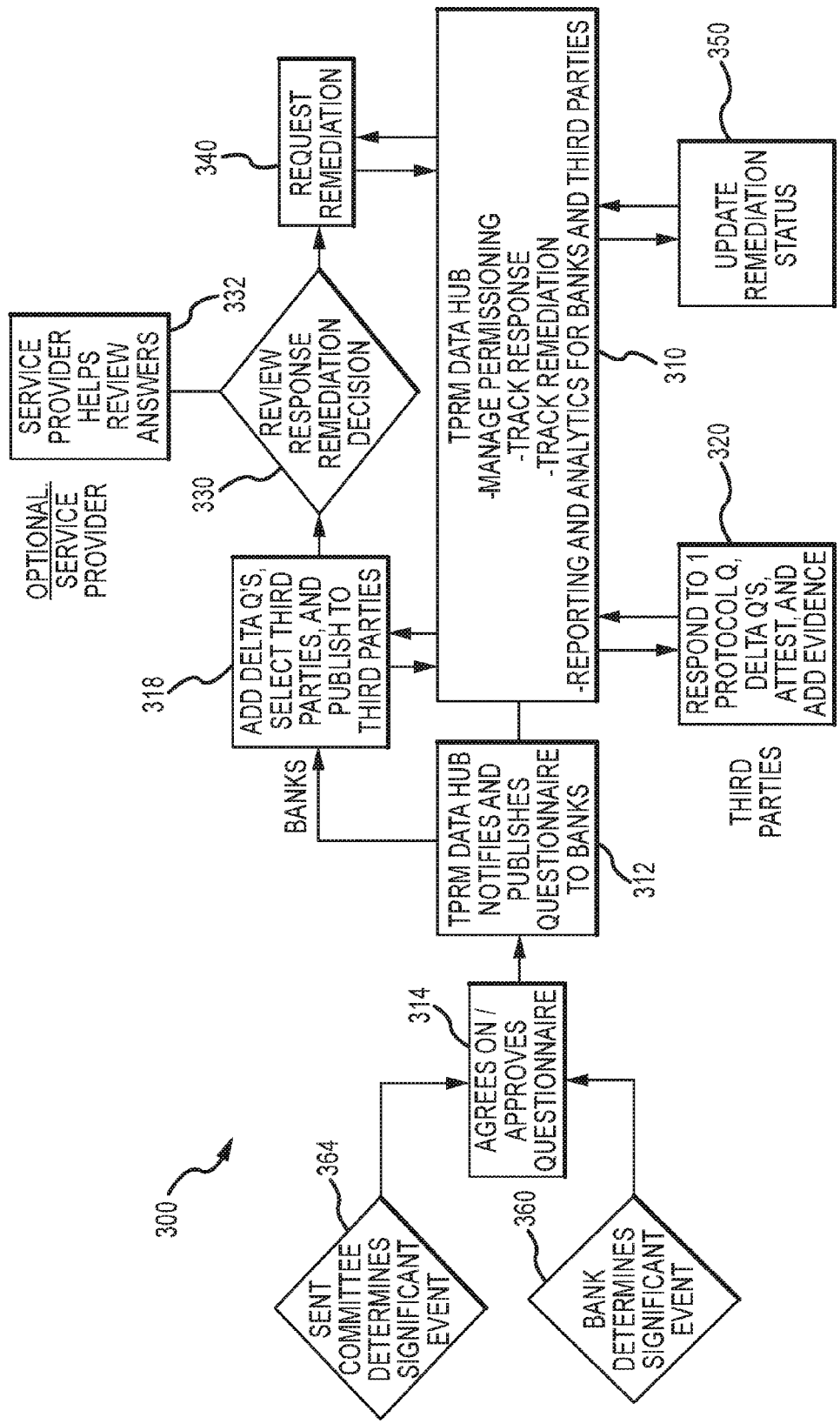
FIG. 3 is flow chart illustrating steps of a third party risk management method provided by operation of systems including a TPRM data hub (such as the systems of FIGS. 1 and 2)

FIG. 3 illustrates, with a flow diagram, a third party risk management method 300 that may be carried out during operation of a third party risk management system such as the systems 100 and 200 of FIGS. 1 and 2, which each include a TPRM data hub 120, 220. In the flow diagram (or work flow diagram) of FIG. 3, a third party risk management data hub (or TPRM data hub) 310 is shown that manages permissioning (e.g., the banks may limit access to their questionnaires and/or the third parties may limit access to their third party risk management data provided via third party due diligence questionnaires). The TPRM data hub 310 also is configured to track responses, to track remediation of any response deficiencies or deficiencies found via analysis of third party risk management information, and to provide reporting and analytics to the banks and third parties, including timeliness of responses.

The method or TPRM work flow 300 may be initiated at 312 with the TPRM data hub 310 notifying banks of the availability of a standard or protocol questionnaire for a type, tier, or criticality level of third party (e.g., based on type of service or product provided by the third parties). At 314, the banks (or other contracting entities) and/or SENT committee agree on and/or approve the questionnaire and its questions for each type/tier/criticality level of third parties. Step 314 typically will be an iterative process where questions are modified, added, and/or deleted from an initial protocol third party questionnaire until a standard one is defined for use by the TPRM data hub 310. The method 300 continues at 318 with one or more of the banks/contracting entities acting to add delta questions to one or more standard third party questionnaires (via communications with the TPRM data hub 310 as shown with bi-directional communication arrows in FIG. 3). Step 318 may also include the banks being able to select one or more third parties from TPRM data hub-provided lists to push the delta-modified questionnaire to or the bank may be able to enter a third party not on the list. At 318, the TPRM data hub 310 may then act to publish the third party questionnaire to the selected third parties.

At step 320, the third party may respond to a standard/protocol questionnaire received from the TPRM data hub 310 or to proactively access and complete such a questionnaire via communications with the TPRM data hub 310. At step 320, the third party may also respond to (provide answers) delta questions from one or more banks. At 320, the third party may also attest their third party information and/or provide evidence supporting their answers to the questionnaire questions. The method 300 continues at 330 with the bank (or TPRM data hub 310, in some cases, or an outside service provider as shown at 332) reviewing the third party's response (third party risk management information). If needed based on the analysis (e.g., a risk rating or score that is below a predefined minimum value, a survey with questions unanswered or improperly answered questions, and so on), step 330 may involve a determination that remediation is required. At step 340, the method 300 continues with the bank requesting that the TPRM data hub 310 obtain remediation of the third party information from the third party. At 350, the method 300 continues with ongoing communications with the third party to obtain remediation of the third party response to a questionnaire and with providing status of the remediation to the requesting bank and/or to the third party performing the remediation. Third parties subscribed to the service may also proactively/responsively provide their own statements and other documentation related to significant events to communicate with their banks/contracting parties.

The method 300 may further continue at 360 with the bank/contracting entity determining that a significant event has occurred. In other cases, at 364, a SENT committee may identify a significant event has occurred. In response, the method 300 may involve significant event notification to the TPRM data hub 310 and, in turn, to third parties. This may involve ongoing monitoring of the third party risk management information such as requesting a refresh of the questionnaire, adding new questions to the questionnaire (delta questions), and the like (see the SENT module of core module 224 of the TPRM data hub 220 of FIG. 2 and discussion of its functionality).

Figure 4:
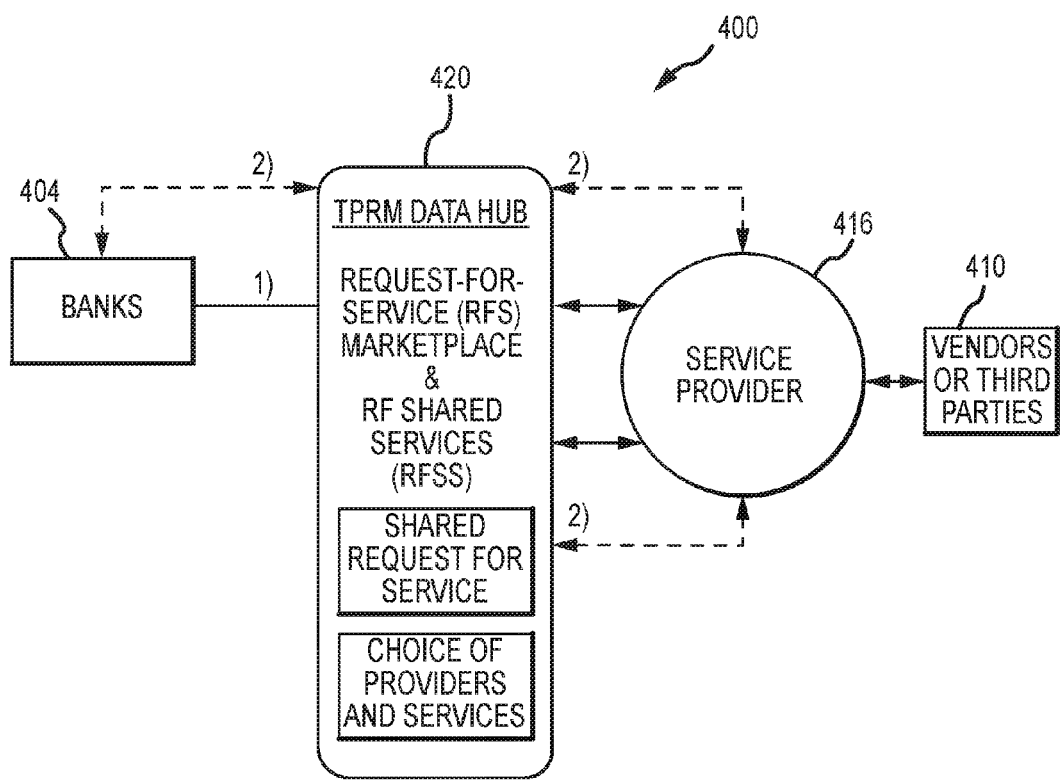
FIG. 4 is a schematic diagram illustrating data flow and/or communications during operation of a third party risk management system of the present description including request-for-service (RFS) and request-for-shared-service (RFSS) functionalities.

FIG. 4 is a schematic diagram illustrating data flow and/or communications during operation of a third party risk management system 400 of the present description including request-for-service (RFS) functionalities. The system 400 includes a TPRM data hub 420 facilitating sharing of third party risk management information and communications between a plurality of banks 404, third parties 410, and a service provider 416. The TPRM data hub 420 is adapted (e.g., with an engine(s) or software running on a central server(s)) to provide an RFS marketplace and also RF shared services. The RFS marketplace offering via the TPRM data hub 420 may include, as shown in FIG. 4: (1) ability for banks 404 and third parties 410 to request services from a service provider(s) 416 for all or any aspects of the TPRM data hub life cycle and (2) complete artifact, communications, and audit workflow capability. Prior third party risk management processes required multiple on-site visits as each third party may have third-party relationships with numerous banks (one on-site visit per bank). Shared RFS brings efficiency and cost savings to both banks 404 and third parties 410 as the banks communicate with the TPRM data hub 420, which provides a shared request for service (RFS) and a choice of providers and services. Each vendor 410 can communicate directly with the TPRM data hub 420 (or via a service provider 416) or via the service provider 416 (as shown), but, typically, not with each bank 404, which reduces the number of on-site visits (e.g., to one on-site visit).

Figure 5:
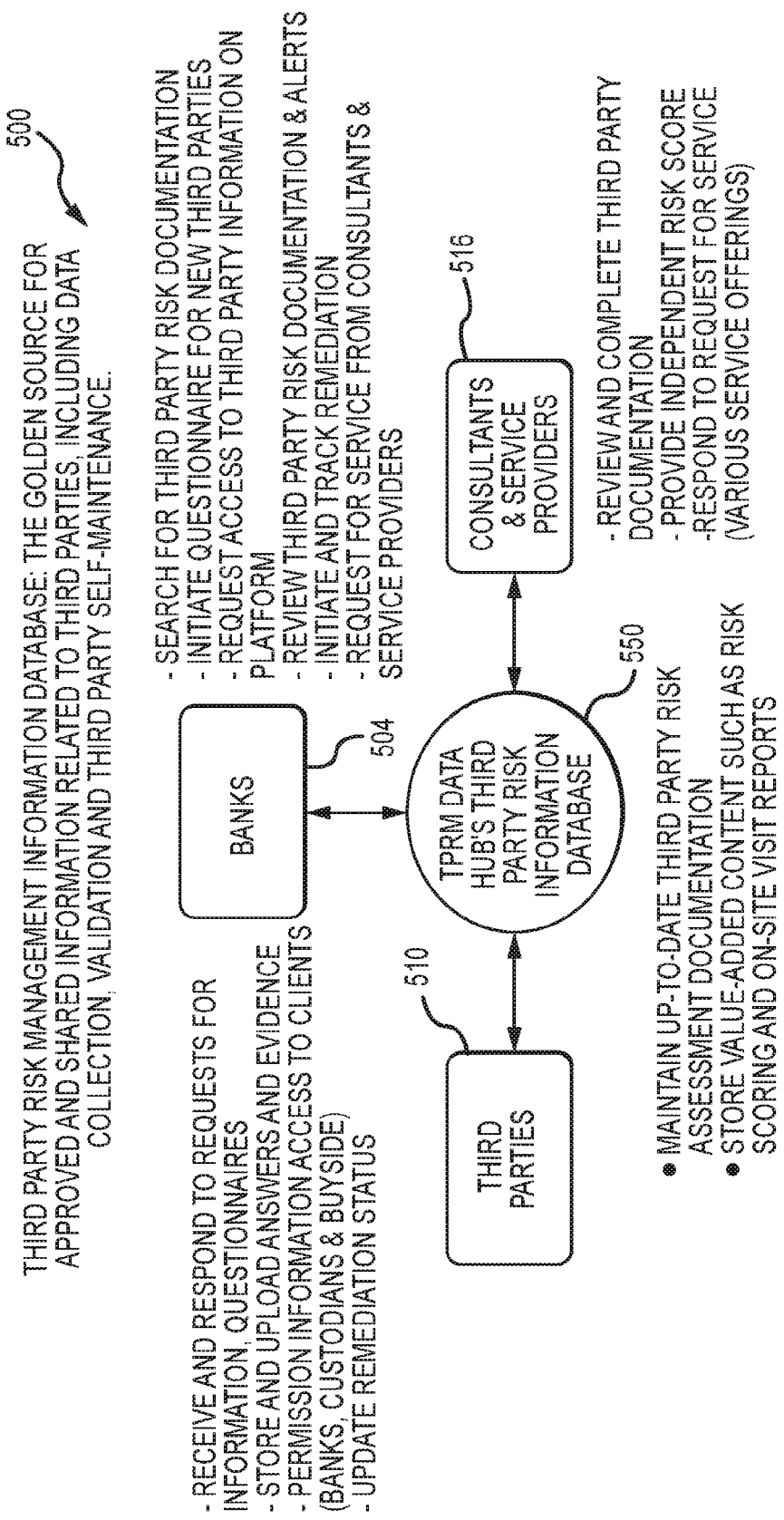
FIG. 5 illustrates schematically a third party risk management system including a TPRM data hub's third party risk management database.

FIG. 5 illustrates schematically a third party risk management system 500 including a TPRM data hub's third party database (or third party risk management information database) 550, which is created and managed (and populated) by a TPRM data hub. With approvals to share and permissioning to approved personnel by each respective party, the TPRM data hub's third party database 550 can be accessed and its data shared by banks or other contracting entities 504, by third parties 510, and by consultants and service providers 516. The database 550 is a source for approved and shared information related to third parties, including data collection, validation, and third party self-maintenance of the data in the database 550, and this shared information can effectively be used to perform nearly all phases of third party risk management by the banks 504. The database management aspect of the TPRM data hub provides the database 550 and may also add value by: providing the RFS and RFSS marketplace whereby various other forms of third party documentation and information may be included in a centralized location including but not limited to: third party risk assessment documentation, risk scoring, penetration tests, on-site visit reports, and providing alerts.

The banks 504 can access the third party database 550 to: (1) search for third party financial profile and risk information/documentation; (2) initiate a questionnaire, such as a due diligence questionnaire, for new third parties; (3) request access to third party information on the platform (managed by the TPRM data hub); (4) review third party risk documentation and alerts, and, in response, initiate and track remediation; and (5) request services from consultants and service providers. The third parties 510 can access the third party database 550 to: (1) receive and respond to requests for third party information such by completing third party questionnaires provided by a TPRM data hub; (2) store and upload documentation, answers, and evidence; (3) provide and/or confirm permission to select ones of the banks 504 or other clients (e.g., banks, custodians, buyside entities, and other financial institutions); and (4) update remediation status and/or perform remediation. The consultants and service providers 516 may access the third party database 550 to: (1) review and complete third party documentation; (2) provide independent risk scores; and (3) respond to requests for service (e.g., to provide various service offerings).

Figure 6:
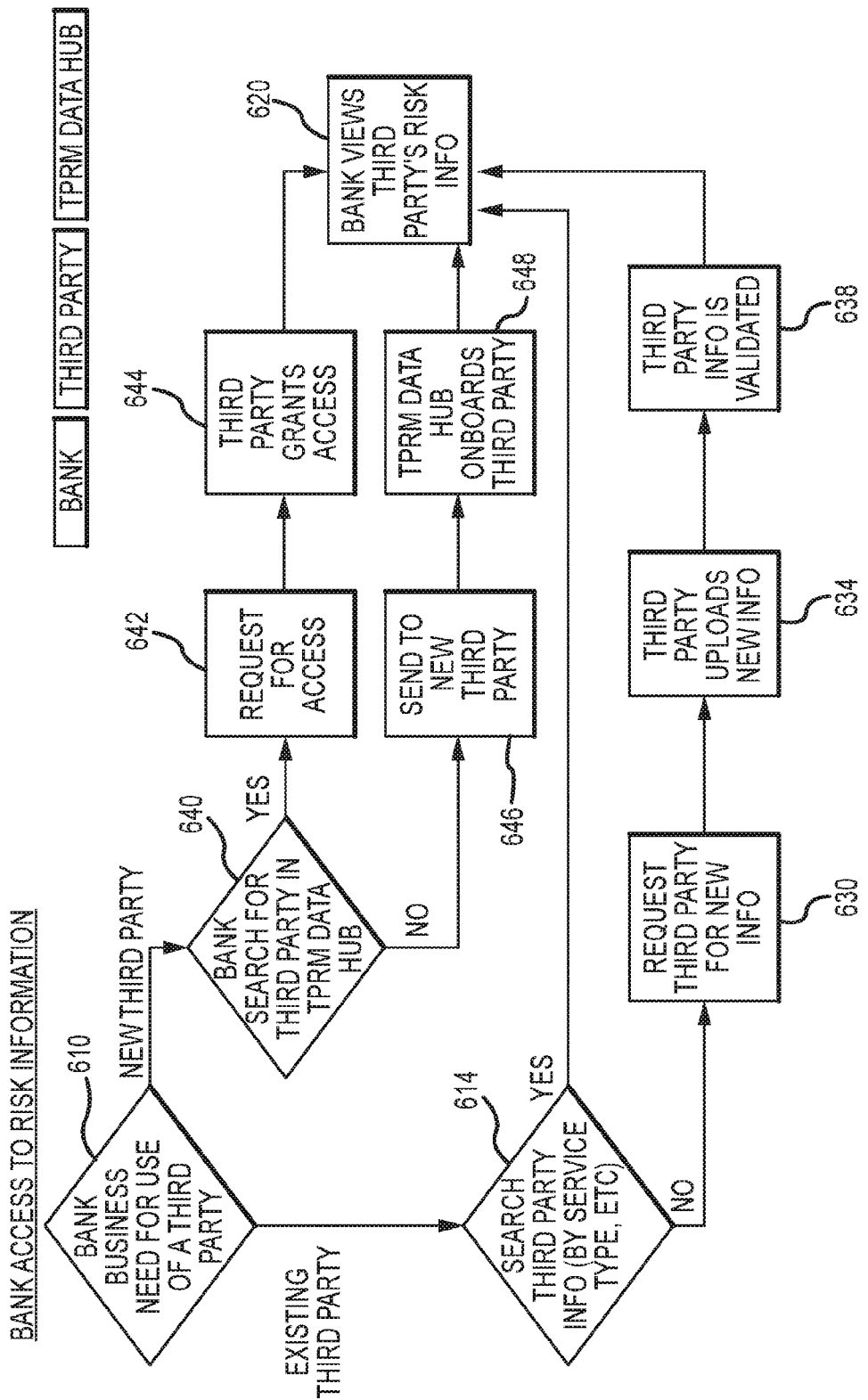
FIG. 6 illustrates a workflow for a bank or other contracting entity in accessing third party risk management information (or centralized, shared risk information obtained from third parties) provided by a TPRM data hub.

FIG. 6 illustrates a workflow or method 600 for a bank or other contracting entity in accessing third party risk management information (or centralized, shared third party risk information obtained from third parties) provided by a TPRM data hub. In the method 600, a bank may determine it has a need for a third party or need for a third party relationship to obtain a service or product. The bank may then search at 614 for an existing third party such as by service type. If an existing third party is found at 614, the method 600 may continue at 620 with the bank viewing the third party's risk information already available via the third party risk management information database managed by a TPRM data hub. If a third party is found at 614 but not for providing the particular service or good, the method 600 may continue at 630 with the bank requesting that the third party provide new third party management or risk information associated with the product or service. At 634, the third party communicates with the TPRM data hub to upload their new information (e.g., complete a new third party questionnaire that may be supplemented or modified by delta questions from the searching bank). The TPRM data hub may also collect statements from the third parties indicating that answers to the third party questionnaire and/or other third party data may be accessed by one or more data consumers (e.g., a defined set of banks or the like). In this way, access to the third party data stored and served by the TPRM data hub is granted on a third party permission-based process, and the sets of permissions provided by each third party may be modified over time and maintained by the TPRM data hub. At 638, the TPRM data hub validates the third party-entered information, and, at 620, the bank may access/view the third party's risk information such as to perform third party risk management including risk assessments associated with having the third party provide the particular service or good to the bank.

In the method 600, the bank at 610 may determine it wishes to use a new third party for a service or product.

Then, at 640, the bank may search for a third party in the TPRM data hub, e.g., a third party that provides that service or product based on their company profile or other information they have used to populate the third party risk management information database. If the third party is found, the method 600 continues at 642 with the bank requesting access to the third party's risk information, unless "blanket" approval is given by the third party for subscribed parties to the service upon which the information will be available by the third party to the subscribed bank. At 644, the third party may respond to the request by granting access or the third party may have given permission beforehand (e.g., permission granted for a list of potential customers/banks, to a list of customer types, and so on). At 620, the bank—if granted permission—can then view the third party's information via access to the database managed by the TPRM data hub.

If at 640 no third party is found, the method 600 may continue at 646 with the bank sending a data request or questionnaire a new third party. Then, at 648, the TPRM data hub may operate to add the third party to the third party list, to request that the third party upload their contact and other relevant third party information (e.g., perform step 634), and to validate the third party information (e.g., perform step 638). The method 600 may then continue at 620 with the bank accessing/viewing the third party risk management information (e.g., answers to the questions in a standard third party due diligence questionnaire and, if applicable for the requesting bank, answers to delta questions).

As can be seen, the TPRM data hub provides technology that enables information sharing/economies of scale that will help banks and other third party-contracting parties to: reduce the amount of time business units require to make decisions on new third parties and monitor existing ones; manage third party risk with greater transparency and knowledge; understand risk at aggregated third party and service levels; identify risk in a more timely manner; and alleviate increased costs in third party risk management in the coming years. There are numerous benefits to third parties in using the TPRM data hub to provide their third party risk management information including: a centralized and efficient means to perform customer requests for information related to third party oversight; reduced due diligence burden and pressures; decreased cost and turnaround time; enhanced ability to properly document and archive responses to third party questionnaires; and ability to gain an additional competitive advantage by being one of the third parties included in the TPRM data hub (or list of participating third parties in the third party risk management system).

The TPRM data hub addresses problems related to process, workflow, and accessibility of key data by providing an easy-to-use and centralized interface to third party questionnaires and third party data. The TPRM data hub also ensures that the third parties provide all their relevant risk data and keep it up-to-date and further ensures that the data is tested as appropriate or desired. The TPRM data hub may be considered "disruptive technology" as it contravenes the current bilateral model and builds a permissioned network of shared information that allows choice—both in process and value-added service selection under the umbrella of risk-mitigated, controlled, and standards-setting flexibility.

The TPRM data hub engine of the present description is configured to implement, in some embodiments, a due diligence questionnaire solution or "DDQS," which allows efficient workflow related specifically to, but not limited to, due diligence questionnaires that the third parties are asked to answer by their contracting parties/banks. Currently, third parties operate in a bilateral process with their contracting parties, with each bank sending their separate questionnaire which very often includes the same or very similar questions. It is a repetitive and time-consuming process. The DDQS (and/or the TPRM data hub) provides a central location of all third party answers to "standard" and "delta" questions in a way that is flexible not imposing like currently available and other envisioned products. The DDQS may use a sophisticated permissioning system that allows banks to request access to third parties' answers and for each third party to selectively grant access to existing and/or to newly added information. One bank/contracting entity may initiate a data gathering process with a third party, but all banks/contracting entities may later benefit as the third party answers the standard questions once but the answers can then be utilized multiple times by the same and other banks.

Using DDQS, the third party questionnaire is dynamic as it is generated in real-time. The questionnaire may be differentiated based on parameters such as service type, third party location, service delivery location, and risk/tier/criticality categories or levels. The DDQS may provide an easy to use GUI that facilitates the generation of delta questions quickly and safely. The TPRM data hub is typically configured to be platform agnostic so as to provide data to any and all existing Governance, Risk, and Compliance (GRC) platforms via APIs and feeds. A web interface is provided in many implementations to allow for easy searching of questionnaires and third party risk management information (answers), for easy reporting, and for ready exporting of data from the third party risk management information database run by the TPRM data hub engine.

In practice, the questionnaire service types may include: advertising; payroll and benefits; business information; brokerage and clearing; insurance; IT (which may further be categorized by hardware, software, telecommunications, and maintenance); market data; occupancy and equipment; office services; personnel training; printing; professional services; and the others based on industry/support needs. The risk types affecting the standard questions in the questionnaire may include: entity profile; financial viability; information security; privacy; business continuity; compliance; human resources security; physical and environmental security; reputation; sustainability; diversity; and more. The questions of a questionnaire may also vary to suit third party location (e.g., United States, Canada, South America, Europe, Asia Pacific, and so on) at least because this will define which sets of regulations and laws need to be complied with during third party risk management.

Figure 7:
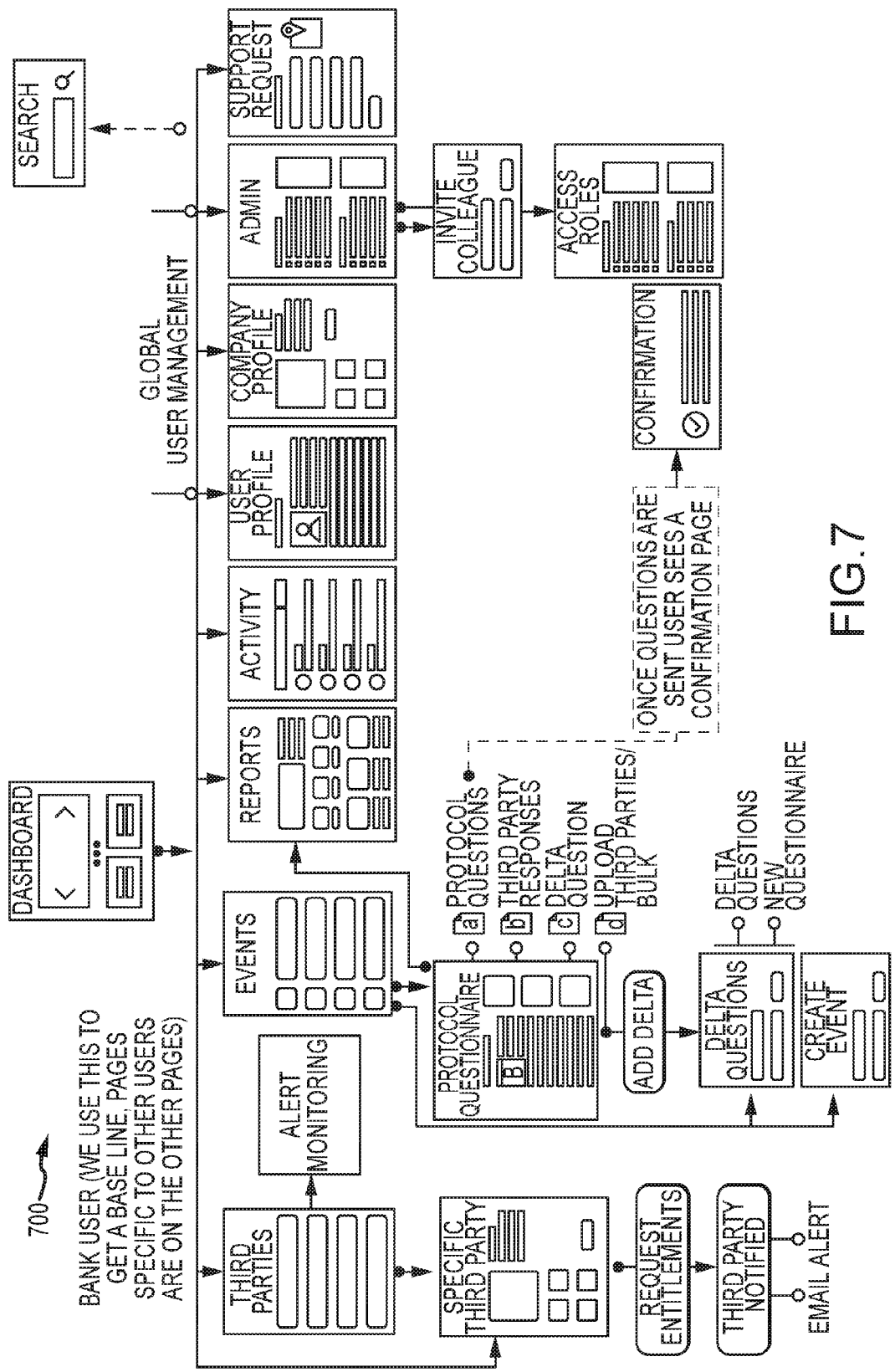
FIGS. 7-9 illustrate TPRM data hub page flow for a bank/contracting entity user, a third party user, and a TPRM data hub administrator user, respectively.
Figure 8:
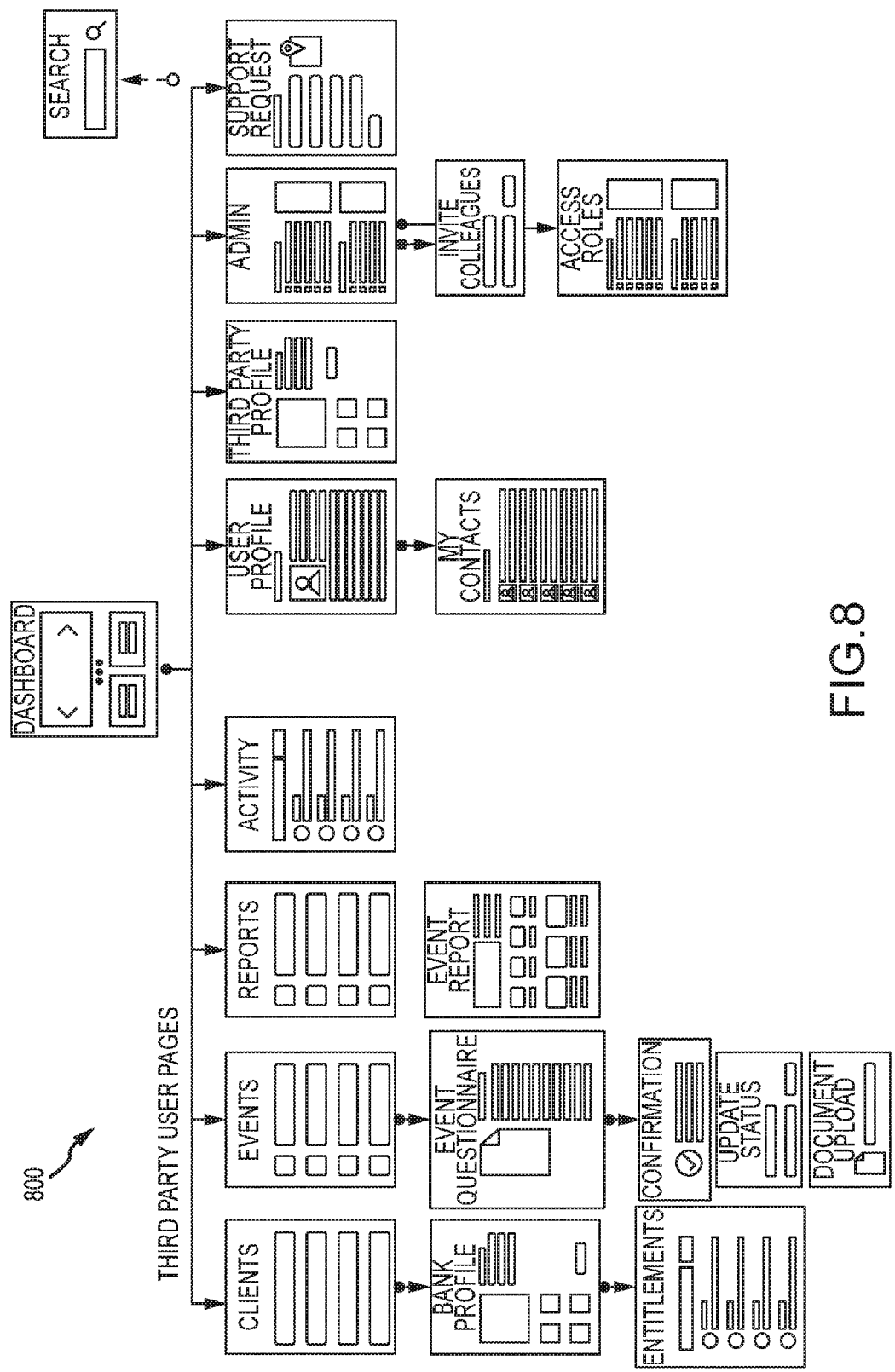
Figure 9:
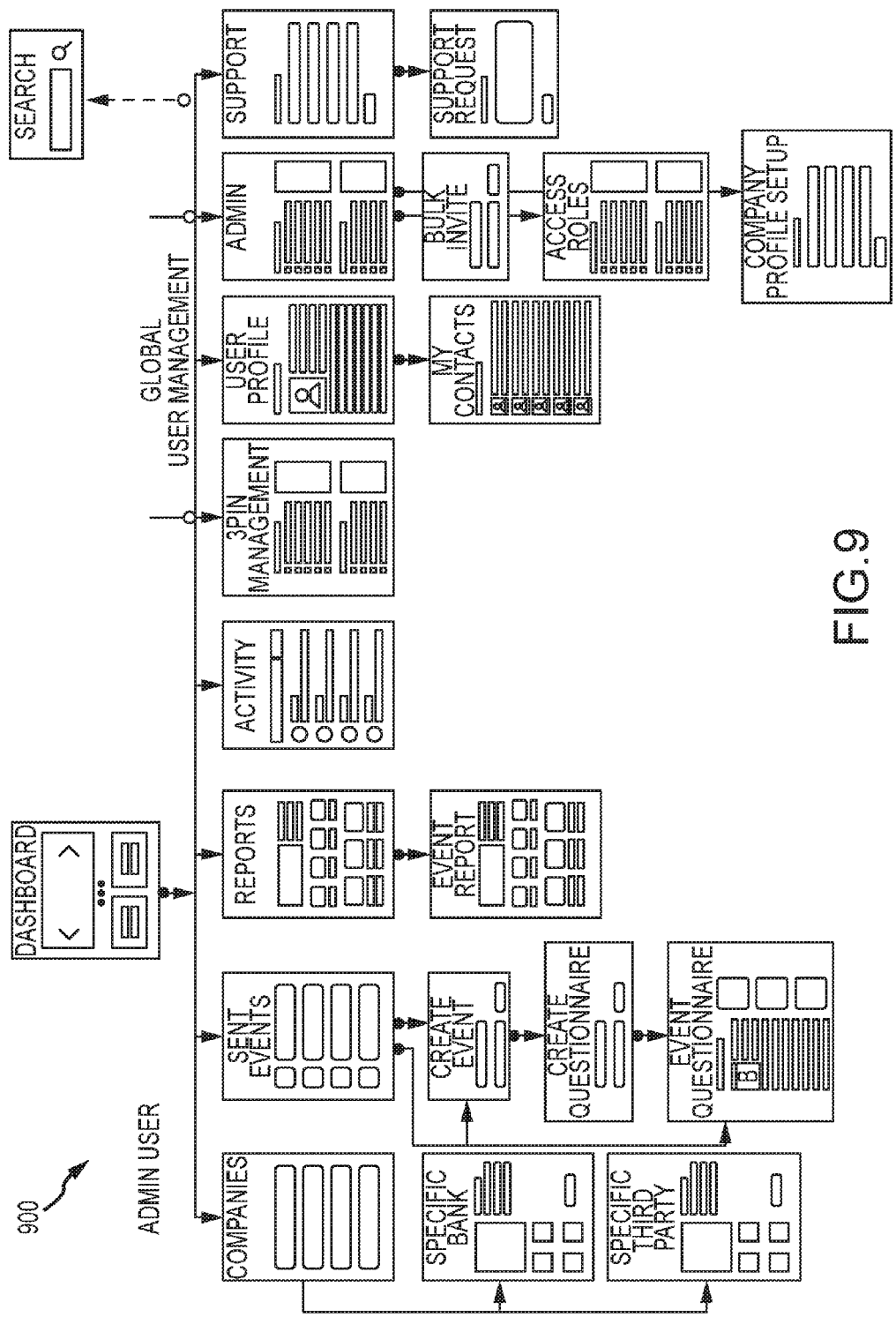
Figure 10A:
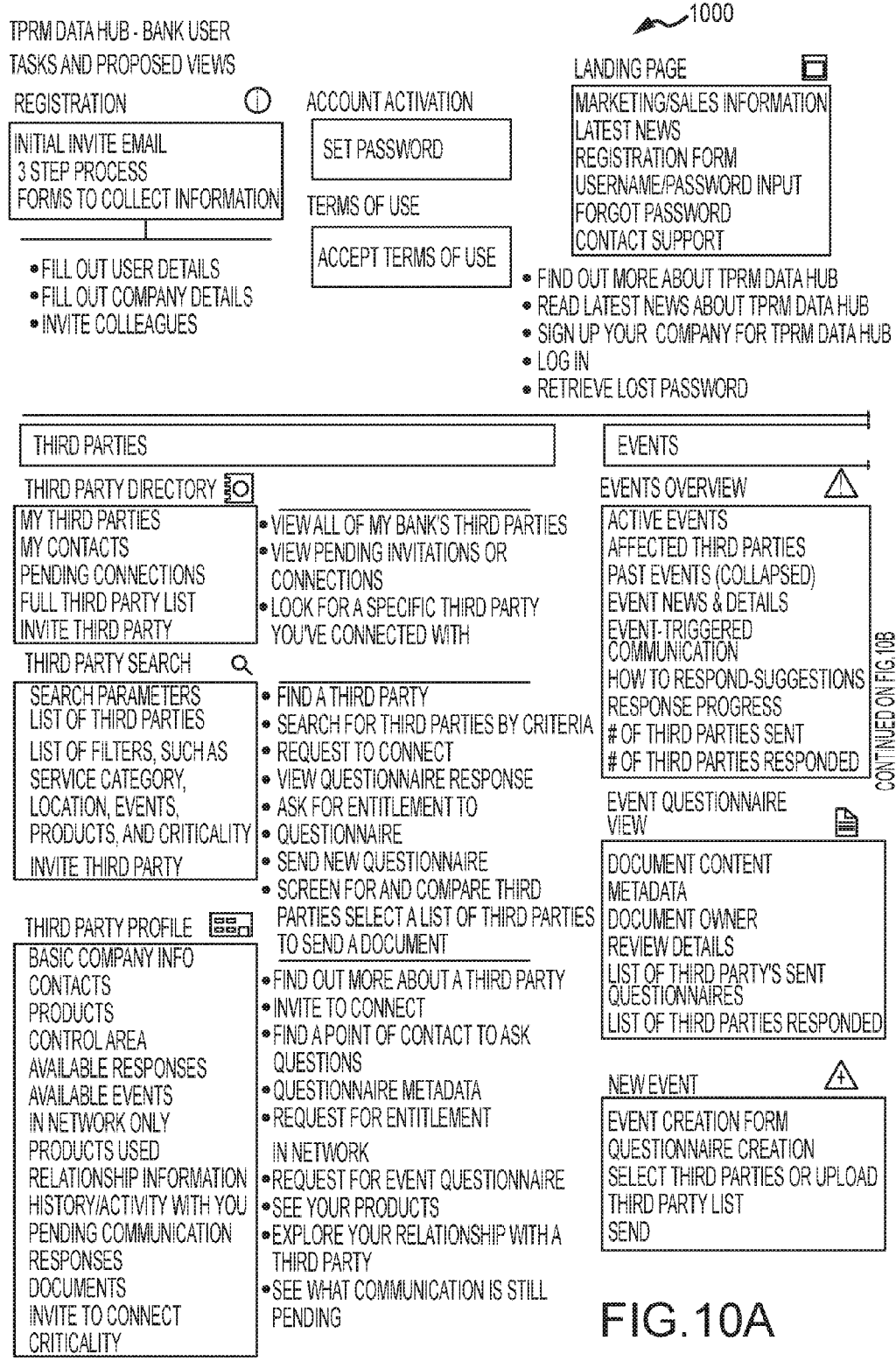
FIGS. 10A-12C are architecture diagrams for a TPRM data hub implementation to support bank/contracting entity, third party, and administrative users of a TPRM data hub system.
Figure 10B:
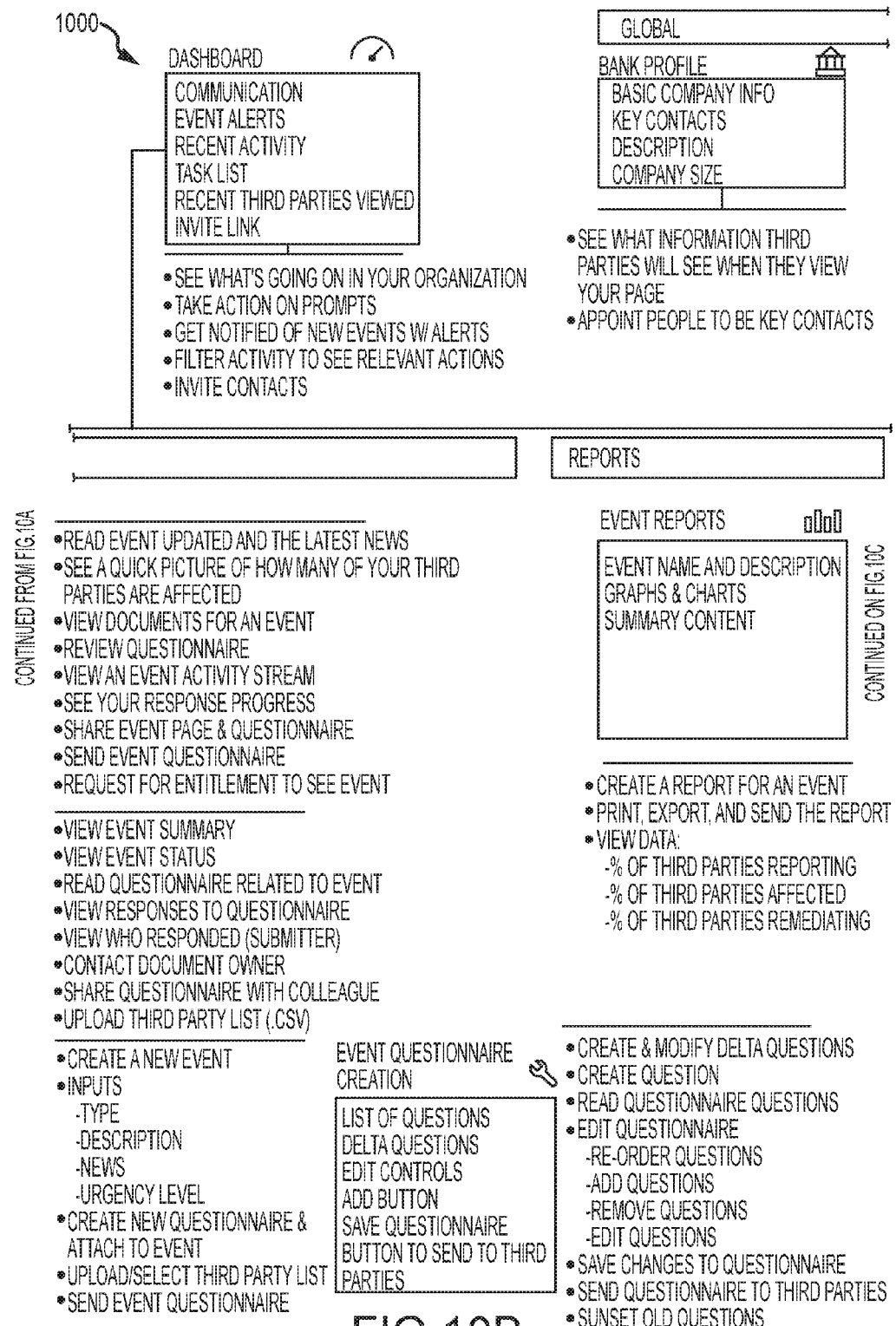
Figure 10C:
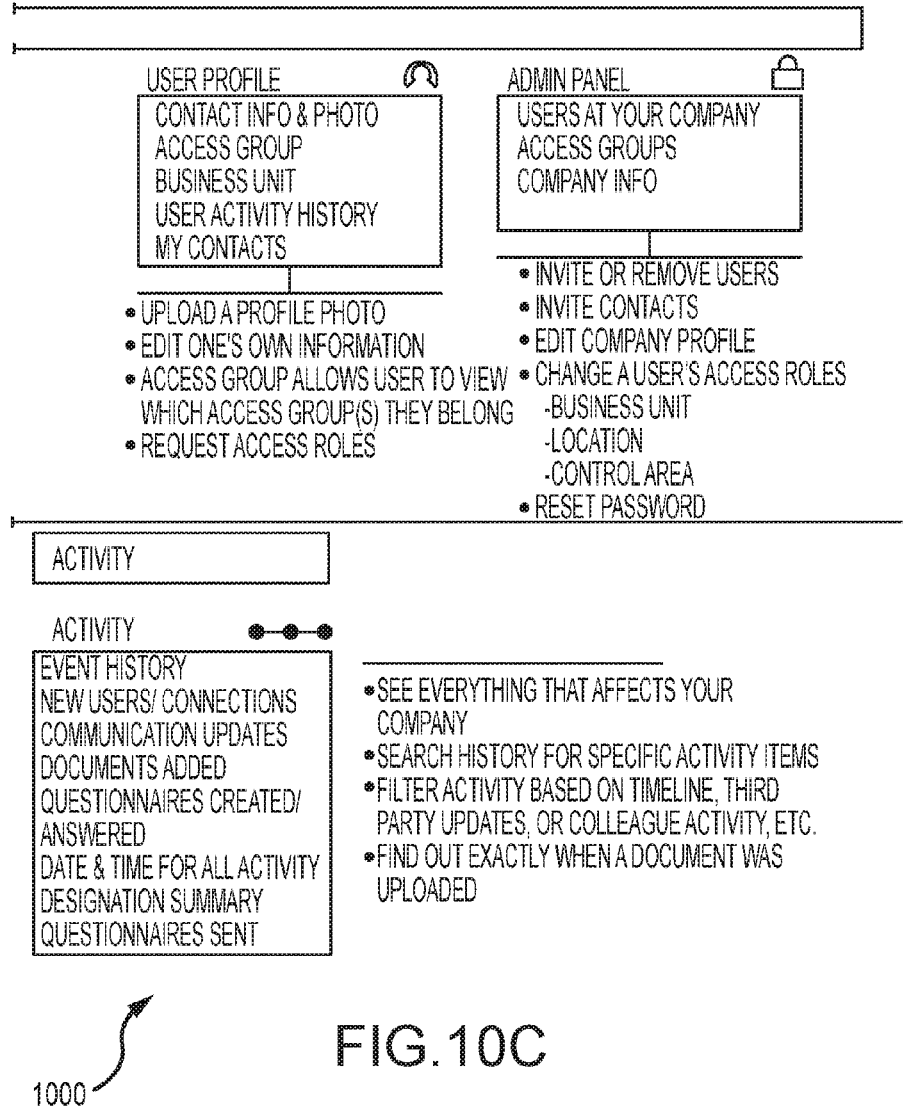
Figure 11B:
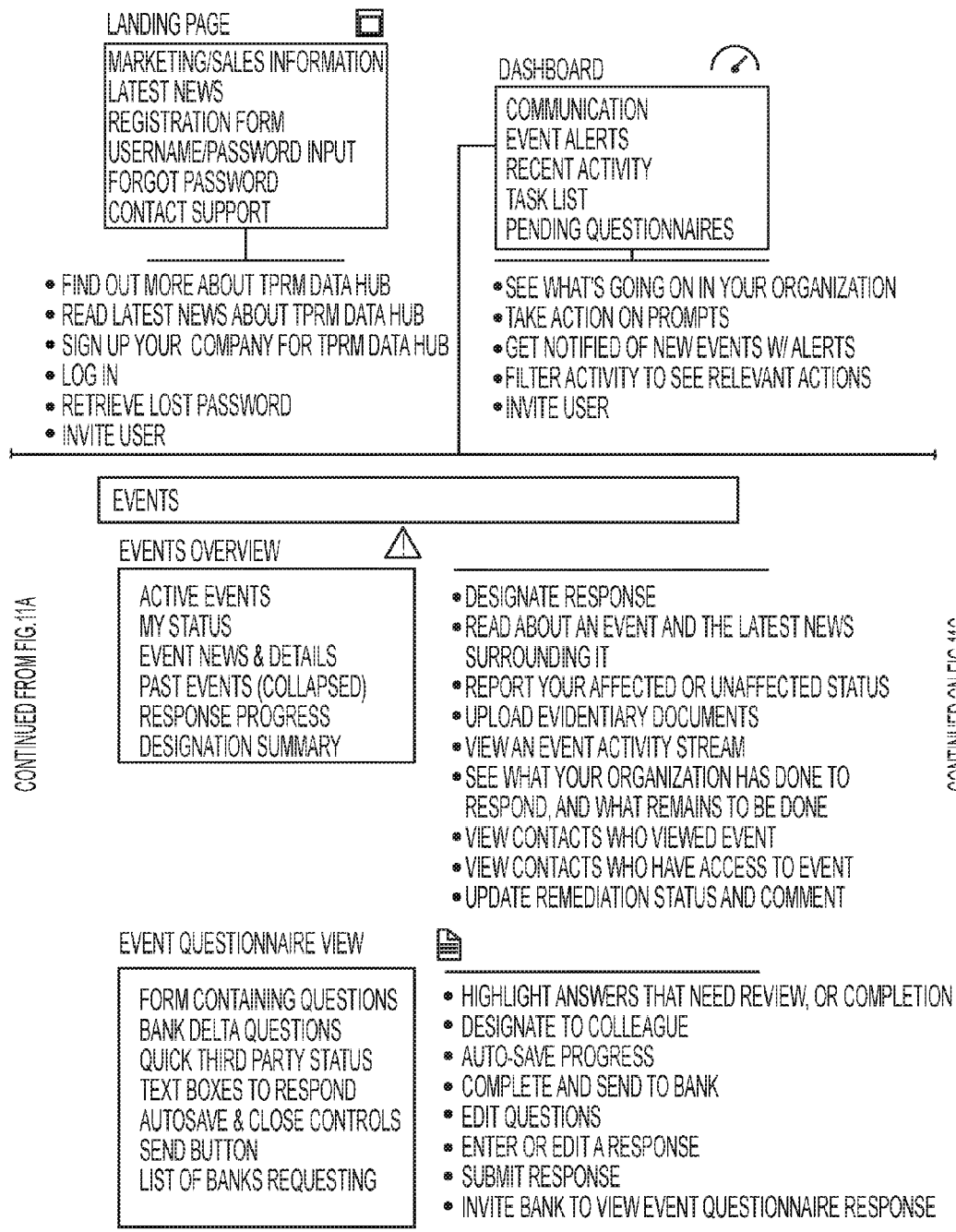
Figure 11C:
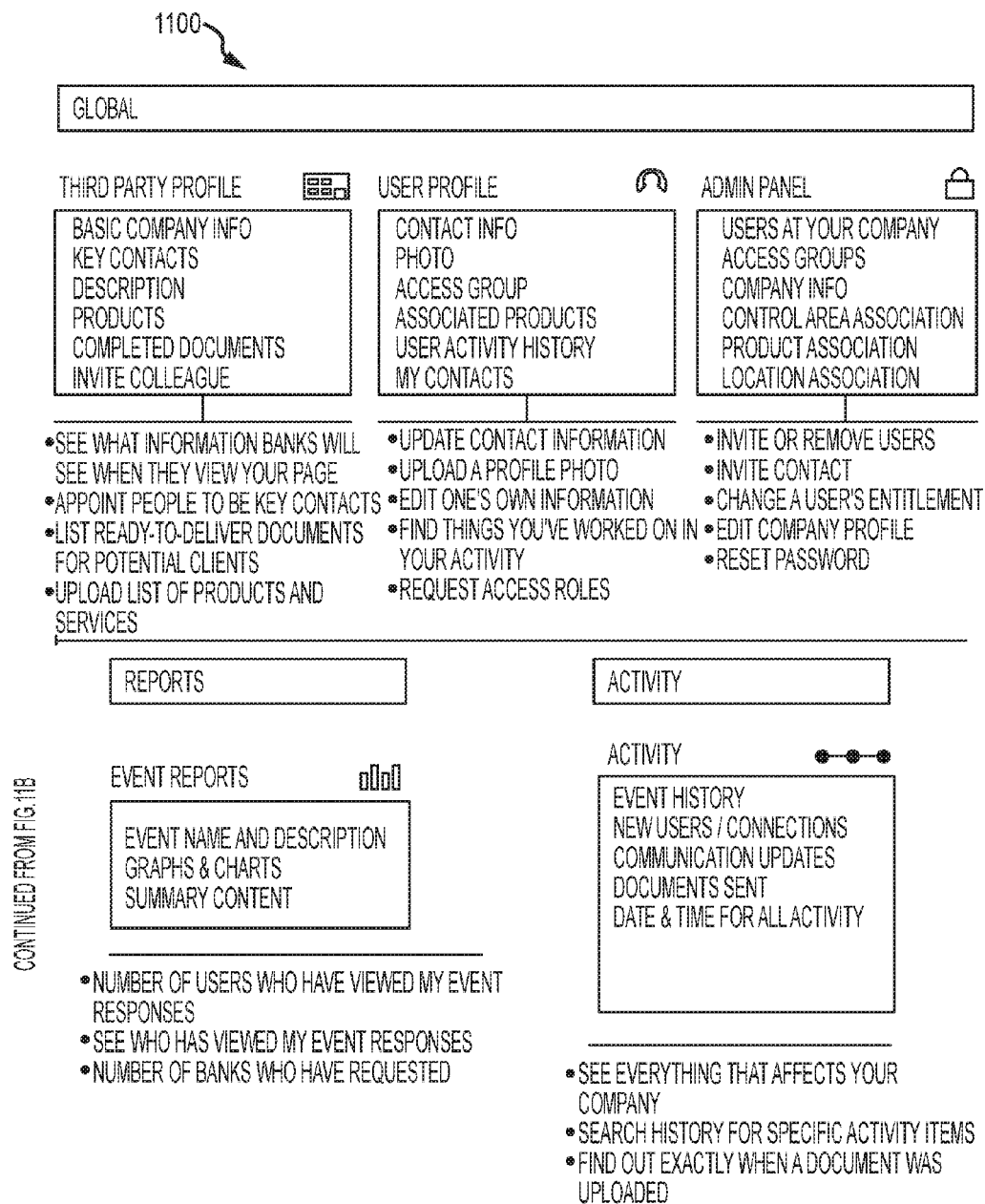
Figure 12A:
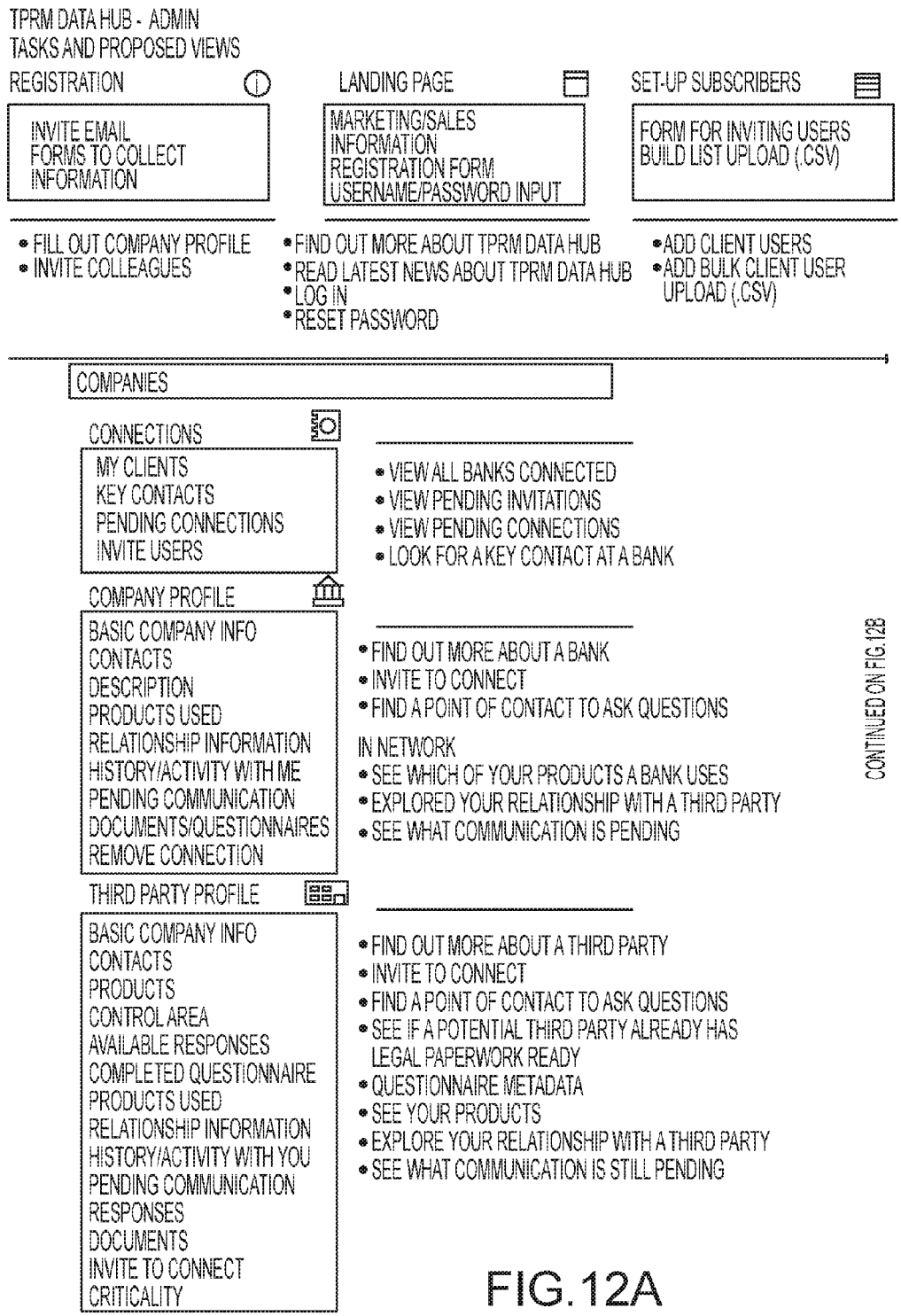
Figure 12B:
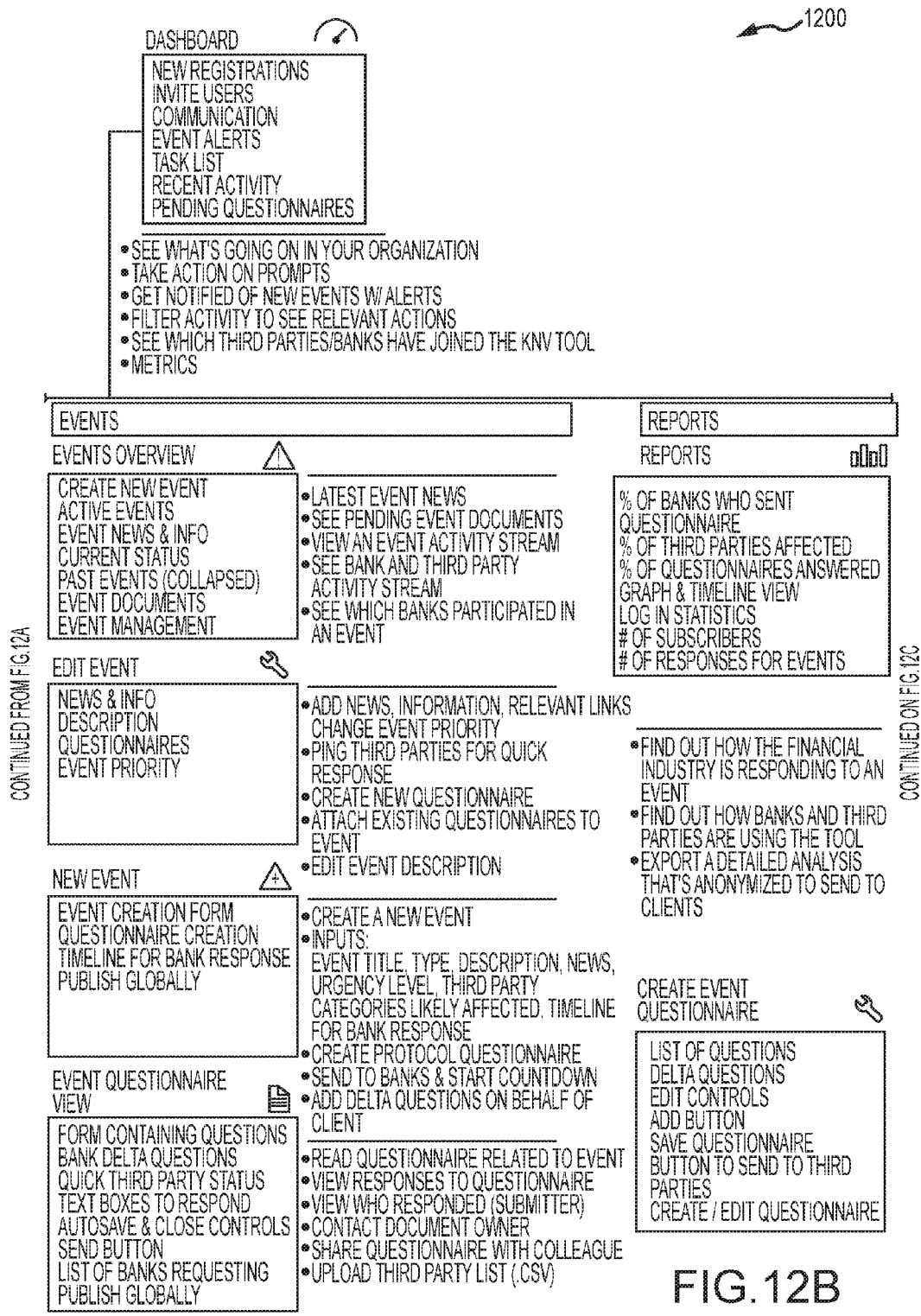
Figure 12C:
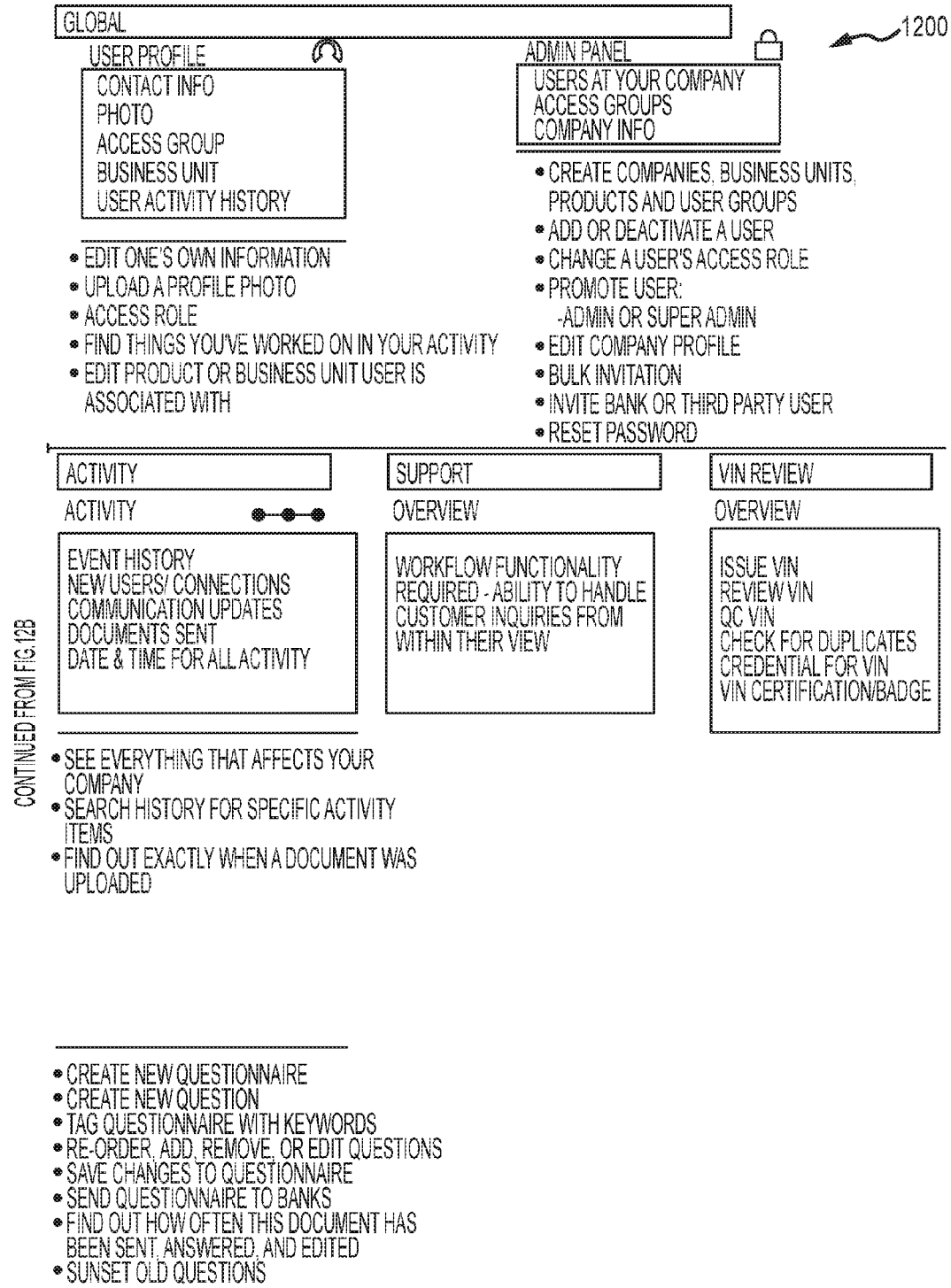
Figure 14A:
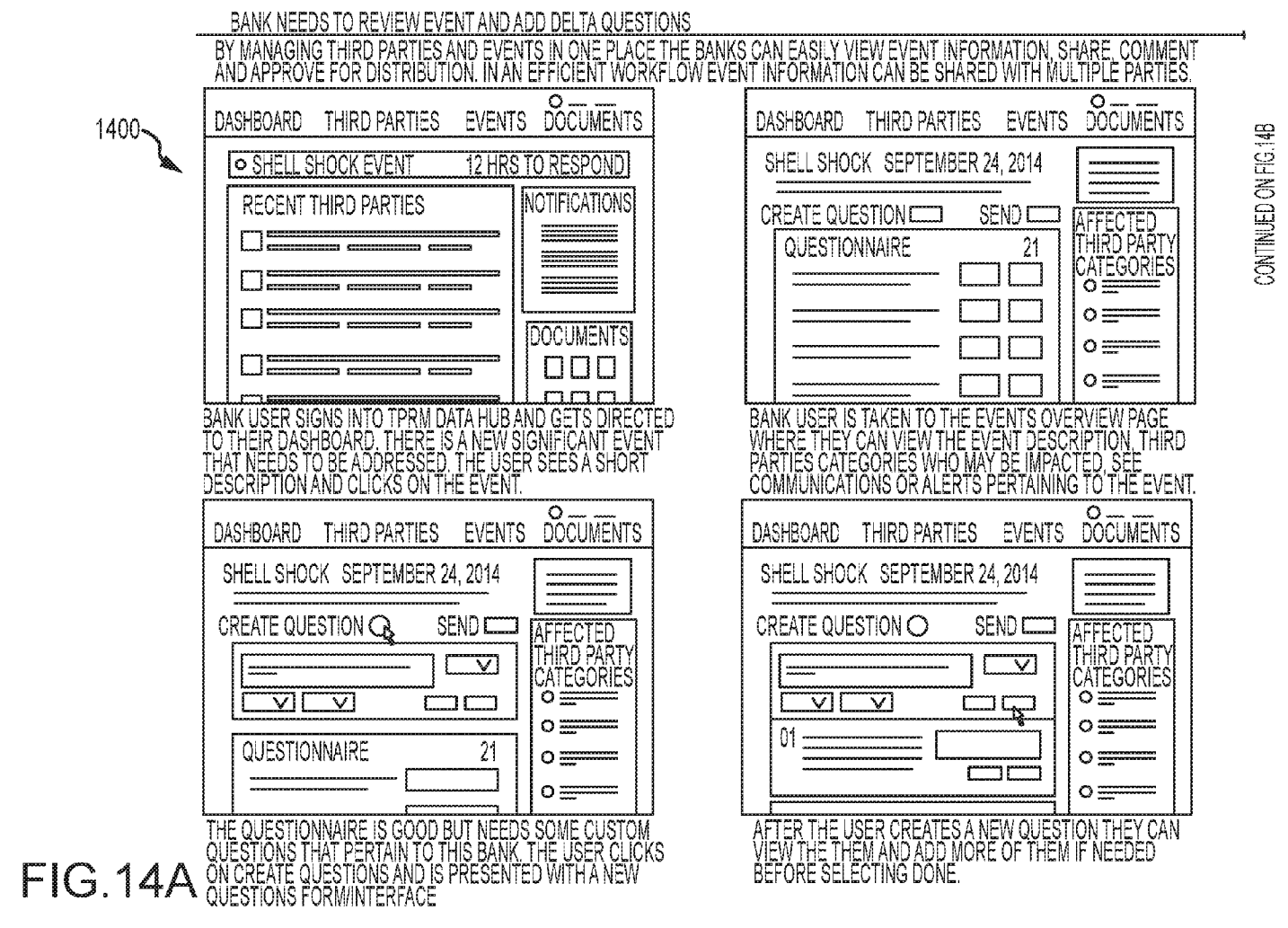
Figure 14B:
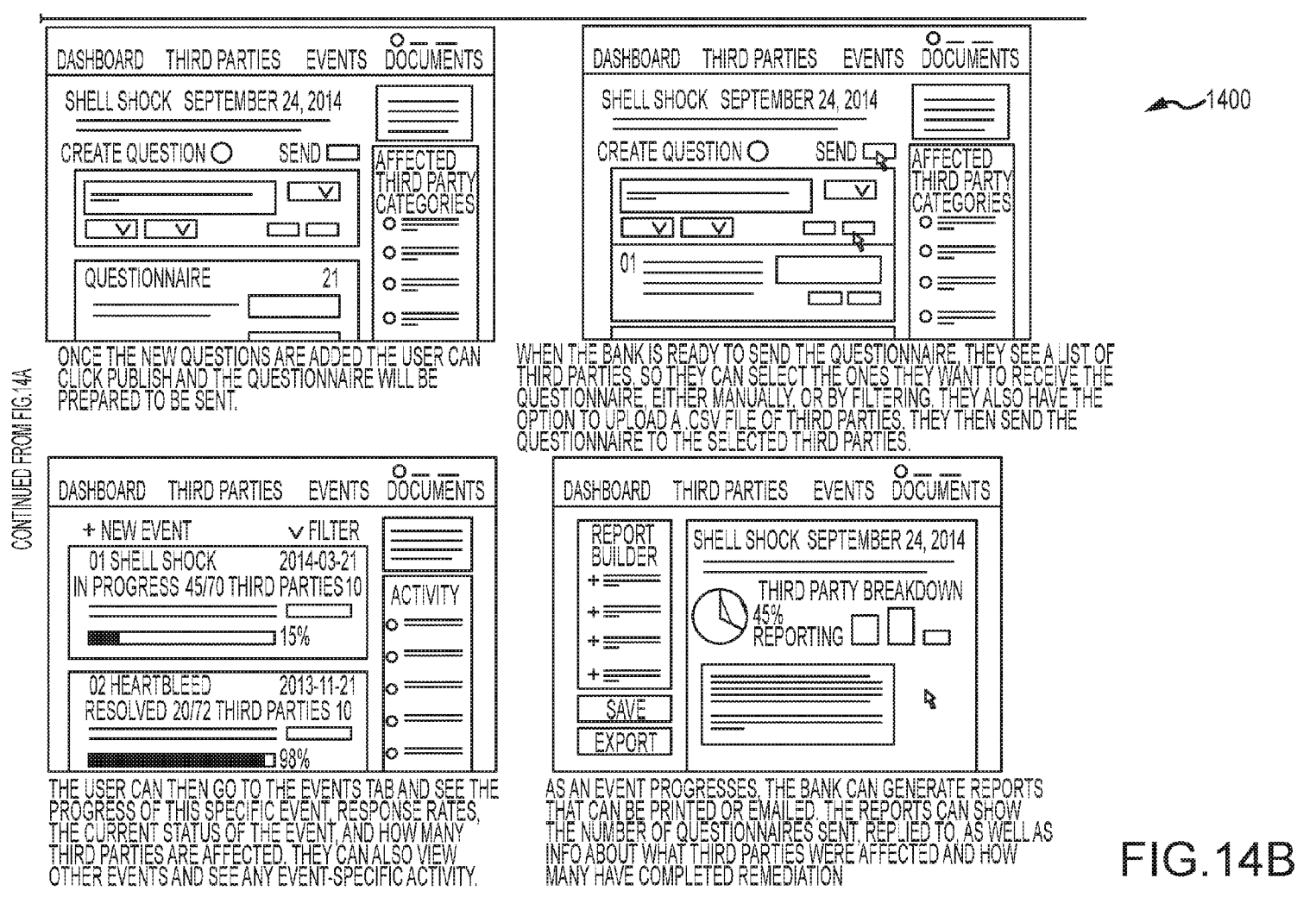
Figure 15A:
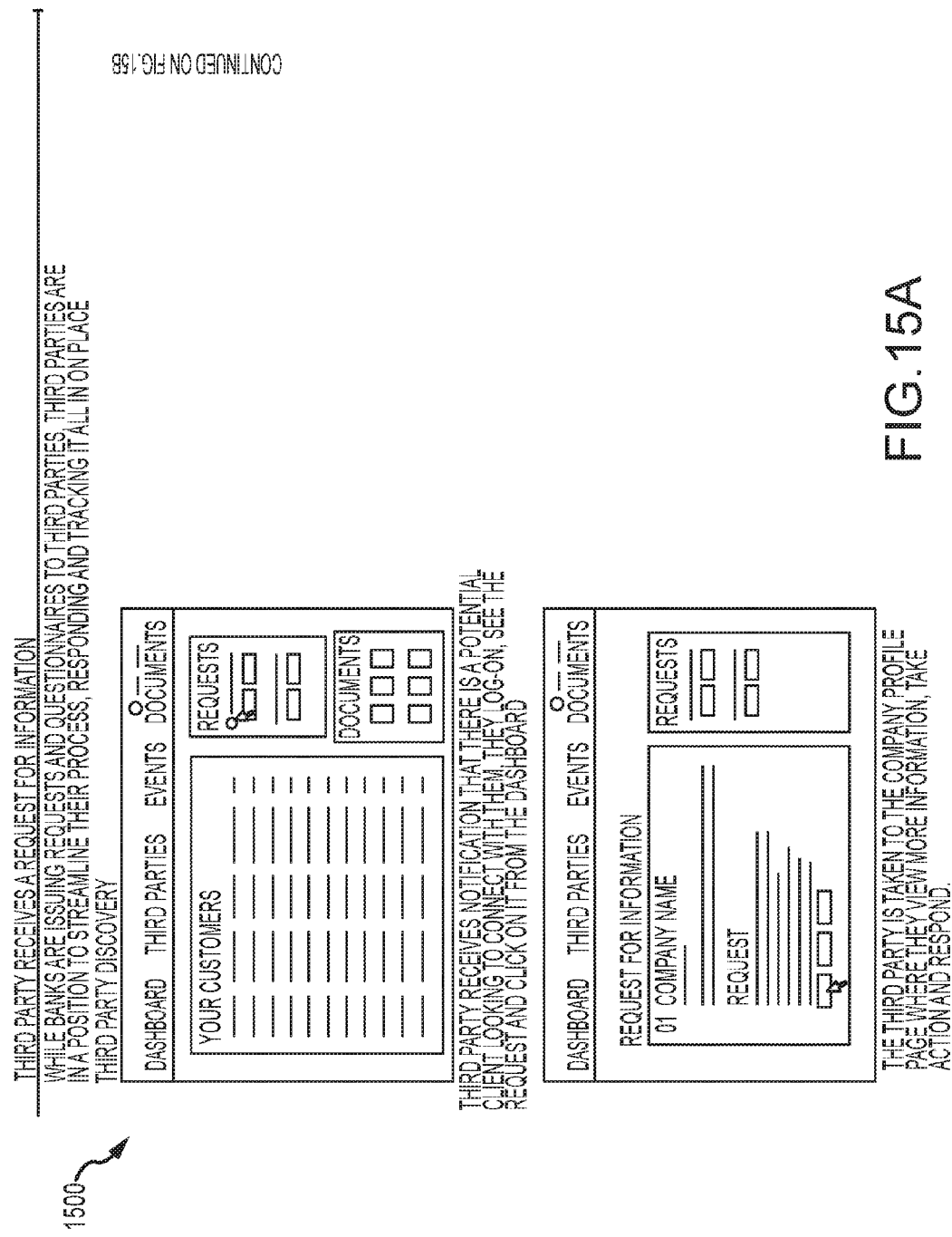
Figure 15B:
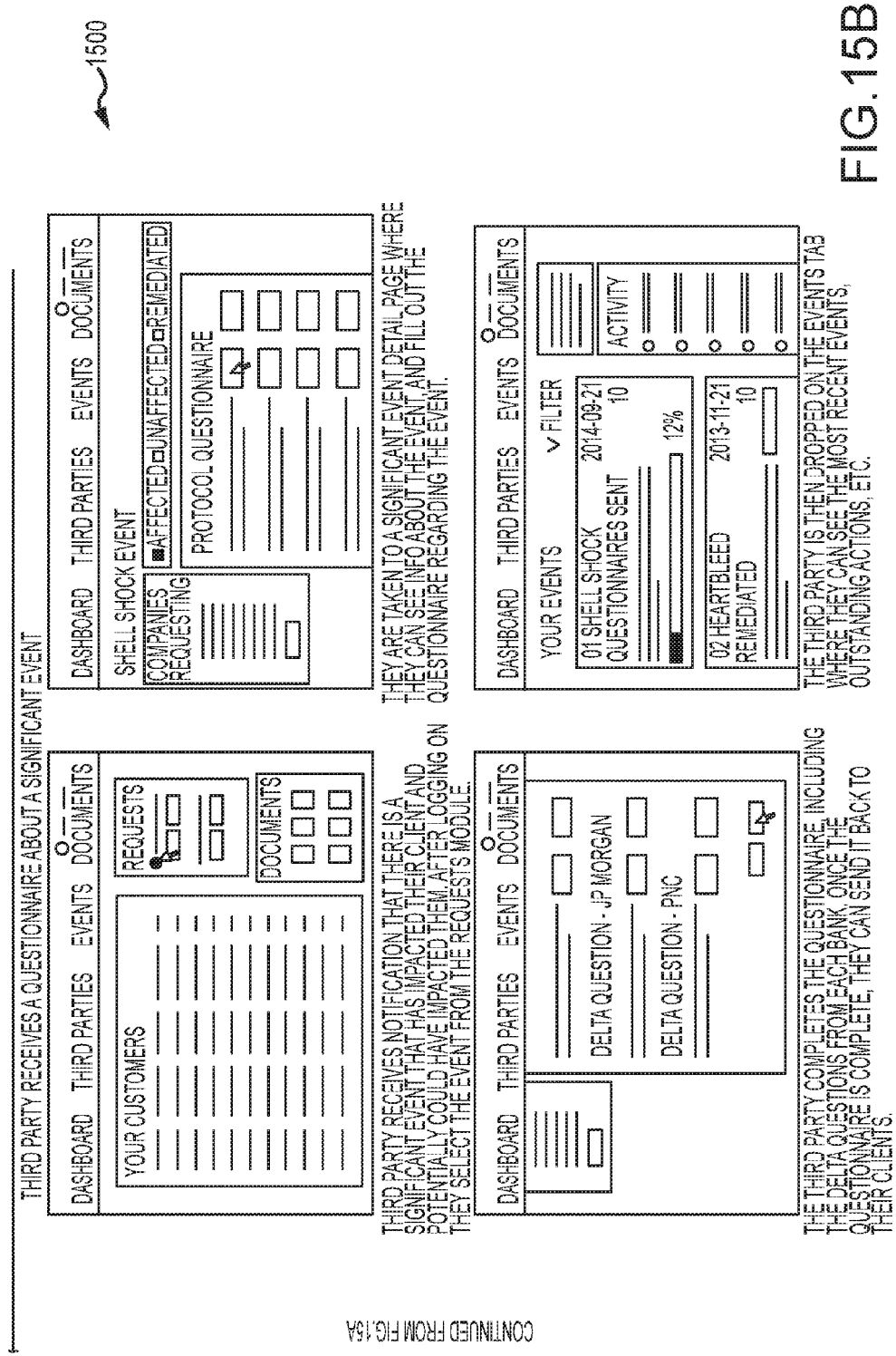

While a wide variety of techniques can be used to facilitate access to the data stored in the TPRM data hub database, FIGS. 7-9 illustrate TPRM data hub page flow for a bank/contracting entity user (with page flow 700), a third party user (with page flow 800), and a TPRM data hub administrator user (with page flow 900), respectively. Likewise, the data presented on each page and actions that may be taken on each page may vary, but it may be useful to consider FIGS. 10A-12C and the architecture diagrams for a bank user (diagram 1000), a third party user (diagram 1100), and a TPRM data hub administrator (diagram 1200). Further, in understanding particular implementations of a TPRM data hub, it may be useful to consider workflow (or processes and communications) that may occur during operation of a system implementing a TPRM data hub. FIGS. 13A and 13B illustrate a workflow 1300 in which a bank/contracting entity user wants to search for a third party and request information from that third party. FIGS. 14A and 14B illustrate a workflow 1400 in which a bank/contracting entity user responds to an event. FIGS. 15A and 15B illustrate a workflow 1500 in which a third party user responds to an event and/or completes a questionnaire.

As discussed above, a third party identification number or "3PIN" may be used within the embodiments of a third party risk management data hub system. In some cases, the 3PIN or 3PINs is created or generated by the TPRM data hub for each third party and/or for each product or service provided by the third party to facilitate a bank or other contracting party to obtain third party risk management information for the portion of the third party entity that is providing a particular service or product rather than the overall third party (unless that is appropriate for the product or service in question). Prior to the invention and creation of the TPRM data hub there has not been a facility for entering and/or creating a 3PIN.

As background with regard to the 3PIN concept, the inventor recognized that prior third party management processes lacked identification and transparency for third party products and services information. As a result, banks and other contracting entities or businesses often had relied upon outdated information, which can lead to inefficiencies and risk in all areas of the third party management lifecycle. The idea for the 3PIN arose in part because data consumers/customers were requesting that a due diligence questionnaire be filled out or completed that referenced multiple products, but often a number of these products were associated with inaccurate information (e.g., name of product or product provider was incorrect, the product or product provider was no longer in existence, and so on).

This presented an ongoing challenge and issue with performing third party risk management as third party information, in the past, had not been centralized, and contracting entities such as banks had to use manual, bilateral communication with third parties to try to track product/service information. Changes to the third party products/services, such as rebranding information and cancellation of products/services, were not effectively communicated and were not centrally tracked. Increasing complexity of third parties (e.g., with multiple divisions and subsidiaries with many diverse locations) was creating more and more discrepancies of third party product/service information between the product/service provider and its consumers (e.g., due diligence contracting parties such as banks). With this in mind, the 3PIN concept was generated by the inventor to create a unique third party product and services code that identifies a third party's products and services and, therefore, allows firms or contracting parties such as banks to efficiently and accurately identify the third party for the life of the third party.

The TPRM data hub, when implemented, provides a platform that is in a unique position to track third party information and provide communication channels between providers (third parties) and consumers, and the TPRM data hub may be used to provide a third party product identifier system using 3PINs. Briefly, product and services actions, similar to corporate actions discussed above, can be tracked and disseminated at the third party product/service-level by the TPRM data hub. Entity and product/service-level hierarchies under an organization structure (or "org chart" or "org structure") may be maintained by or within the TPRM data hub along with linkages to other data such as Entity IDs, a category that the product/service is assigned to, and the like. 3PIN creation is driven by the customer's need for requests for information related to the correct product/service, and the TPRM data hub can meet this need by implementing 3PINs for third parties. The use of 3PINs is useful for creating a unique dataset, for providing strong data governance by utilizing IDs and forming processes around corporate and product/service-level actions as well as hierarchies, for increasing efficiencies in the due diligence questionnaire process by ensuring that the questionnaires are sent and responded to for the correct product/service, and for mitigating third party risk by automatically generating and transmitting to customers/contracting entities updates on third party product/service structures.

The 3PIN is a new identifier for products and services for third parties. In some implementations, the 3PIN is linked to an entity ID. The TPRM data hub (or a 3PIN module or engine of the hub) in some implementations detects or identifies when a third party goes through a corporate action (such as a name change or addition of a new division), and, in response, the TPRM data hub updates the 3PINs linked to this third party such as by linking the 3PIN to a new entity. The TPRM data hub may be configured to provide guidance to third parties on what is a service/product for proper registration (e.g., prompting via a page of a TPRM data hub GUI). For example, the products/services that should be registered via the TPRM data hub for assignment of a 3PIN may be the lowest-level product or service that due diligence is performed on by data consumers/contracting entities (e.g., is the product/service sold separately, does product have distinct management oversight, and other questions may be asked to identify the lowest-level product or service for registration). It is likely the 3PIN database managed by the TPRM data hub will include thousands to millions of products/services with new 3PINs created following events.

The data collected from the third party by the TPRM data hub (again, likely, through an electronic fillable form provided in a UI to the TPRM data hub) may vary but often will include: a link to the third party (or portion of the third party) providing the product/service; a product/service name; a product location (e.g., global or regional/country); service category; product description; product URL; and linkages to hierarch of products/org structure. The TPRM data hub performs validation on required fields/data entered in the new product registration form/UI and may perform fuzzy logic for duplicates, and when any identified issues with the product registration is resolved a 3PIN is generated for the third party's product by the TPRM data hub.

The 3PIN may take a variety of forms to provide a unique identifier for third party products and services. For example, the 3PIN may be configured as a multiple character (e.g., 8 to 16 alphanumeric characters) alphanumeric ID with groups of the characters being used for differing functions. In one embodiment, the 3PIN is a thirteen-character alphanumeric ID with: the first four characters used to display a prefix for branding and recognizing the ID by data consumers and third party users; the next eight characters being randomly assigned alphanumerics (with vowels being excluded in some implementations); and the final character being an algorithm-based check digit that is used by the TPRM data hub to validate the ID. It may be useful for the 3PIN to be non-indicative of characteristics like the service category, but the 3PIN may be processed to map to the characteristics or data points. The thirteen-character alphanumeric ID implementation of the 3PIN is desirable as it makes available 852 billion unique combinations of IDs such that IDs do not have to be reused. In some embodiments, the entity ID linked to the 3PIN is embedded into the 3PIN such as with a set of characters provided as a prefix to the randomly assigned set of characters of the 3PIN.

The TPRM data hub also may be configured to, similar to entity-level corporate actions that may require a change to an entity/third party's ID (e.g., a name correction, a rename, a merger, an acquisition, a demerger, a spin-off, or a ceased (when an entity is wound down and ceases operations)), track products and services actions (PSAs) so as to maintain proper third party product/service identification. Sourcing may be primarily driven by third party upkeep via interactions with the TPRM data hub, and the TPRM data hub may operate to automatically generate and transmit periodic (e.g., annual) refresh data requests to the third parties to update their 3PIN registrations (or data in the 3PIN database). Additional sources may also be utilized to supplement these periodic, third party-based updates such as via website scraping (manually or using computer-based tools such as web site scraping software or the like).

The following is a list of PSAs that may be tracked, and the list is followed by a brief description and an associated change to the 3PIN identifier made by the TPRM data hub in response to the PSA: (1) name correction; (2) rename; (3) merger; (4) acquisition; (5) demerger; (6) spin-off; (7) ceased; (8) reorganization; (9) intercompany acquisition—standalone; (10) intercompany acquisition—merger; and (11) intercompany acquisition—absorbed. Each or a subset of the PSAs may also trigger an alert by the TPRM data hub.

In a name correction type of PSA, a product or service has its name updated (and could include updating for spelling, punctuation, or an invalid name). A name correction typically would not require a change to an existing 3PIN. In a rename PSA, an existing product is renamed or rebranded, and, again, there typically would be no change to an existing 3PIN by the TPRM data hub. In a merger PSA, two or more products/services are merged to become one new product, and the TPRM data hub would respond by flagging the merging products' 3PINs as inactive and creating a new 3PIN for the newly formed product/service. In an acquisition PSA, a product or service is acquired or absorbed by another existing product, and the TPRM data hub acts to flag the 3PIN of the acquired product or service as being inactive, and typically there is no change made to the 3PIN of the product that made the acquisition. In a demerger PSA, a product demerges to create two or more new products, and the TPRM data hub flags the 3PIN of the product that demerged as inactive and creates new 3PINs for the newly formed products. In a spin-off PSA, a product is newly formed by being spun-off from an existing product, and the TPRM data hub may respond by creating a new 3PIN for the newly formed product (while making no change to the 3PIN of the existing product). In a ceased PSA, a product or service is wound down and ceases operations, and the TPRM data hub may respond to detecting this type of PSA by flagging the associated 3PIN as inactive. In a reorganization PSA, a product's position in the org structure is changed so it has a new parent product or division, and, in such cases, there may be no change to the existing 3PIN. In an intercompany acquisition—standalone PSA, a company acquires a product from another company, and the product remains as a standalone in the new company. When such PSAs are detected, the TPRM data hub may act to flag the 3PIN of the product that was acquired as inactive and may further act to create a new 3PIN for the product in the new company or third party. In an intercompany acquisition—merger PSA, a company acquires a product or service from another company, and the product is merged with one or more products or services within the new company to create a new product or service. In such cases, the TPRM data hub may flag as inactive the 3PIN of the product/service that was acquired and also of the products/services that were merged together, and the TPRM data hub may also create a new 3PIN for the newly formed product. Finally, in an intercompany acquisition—absorbed PSA, a company or third party acquires a product from another company or third party, and the product is absorbed into one of the acquiring company's existing products. The TPRM data hub may be configured to respond by flagging as inactive the 3PIN of the product that was acquired (with no change typically being made to the 3PIN of the product that made the acquisition).

The TPRM data hub may provide and control the distribution channels for accessing the 3PIN and associated data such as via an external UI, via file downloads, and/or external APIs. For example, a data consumer/contracting entity or third party may log onto the TPRM data hub to gain access to a 3PIN UI. This external UI may be used by the TPRM data hub to display a 3PIN, an entity ID linked to the 3PIN, and supporting data fields in all relevant areas for the underlying third party product/service for the 3PIN. The external UI may provide a new screen workflow for displaying corporate actions, PSAs, and hierarchies associated with each 3PIN (i.e., for each product/service). The external UI may also be generated/supported by the TPRM data hub to provide enhanced workflow to facilitate registration of products/services by third parties entering input. The external UI may also be configured to provide hierarchy diagram charts for third parties and, in some embodiments, for product and service categories. File downloads may be supported by the TPRM data hub to allow data consumers (e.g., banks) and third parties to obtain 3PIN data, PSA history, and corporate action history. External APIs can also be supported by the TPRM data hub to provide access to PSAs, corporate actions, and other information via the 3PINs.

Figure 16:
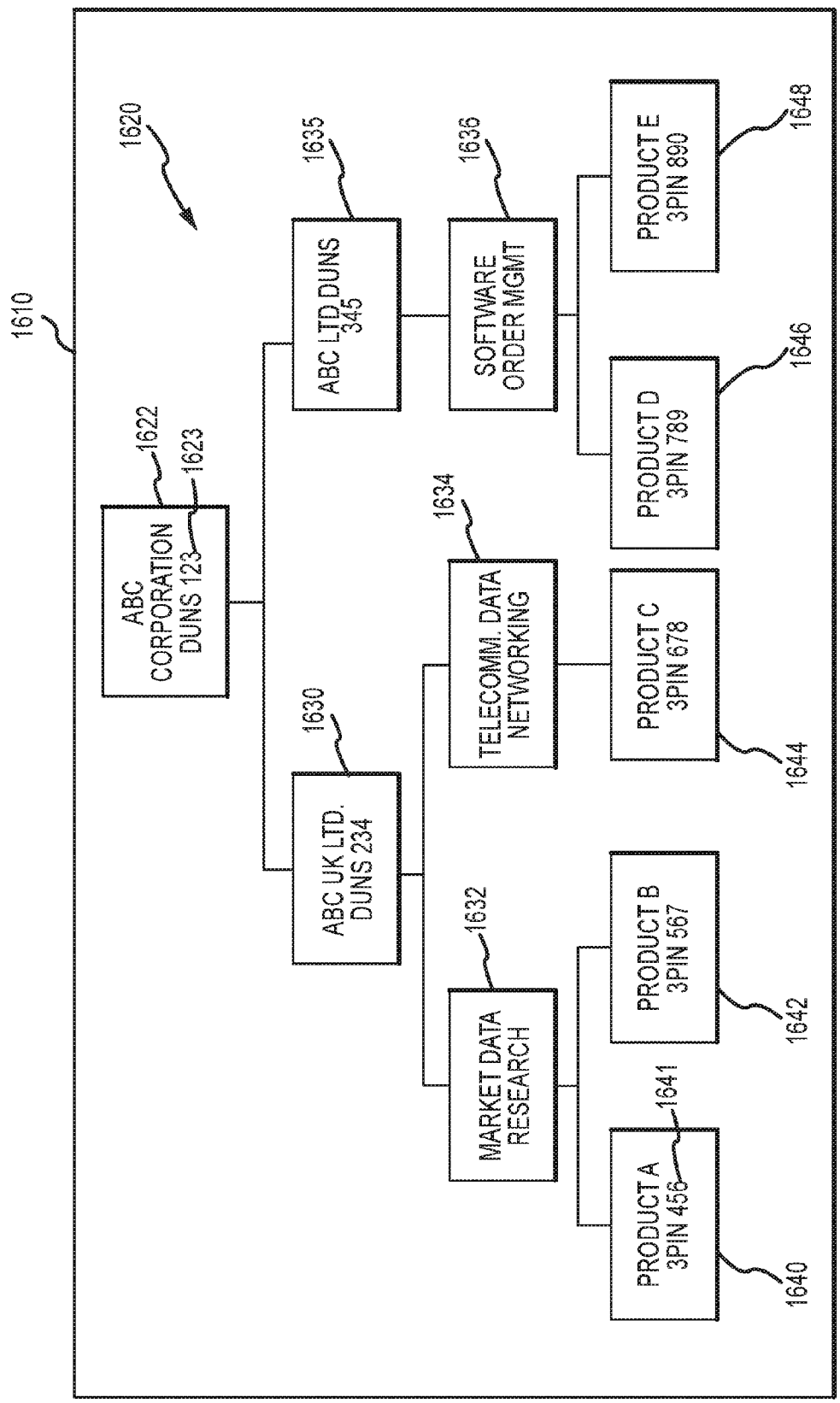
FIG. 16 is a screen shot of an exemplary external user interface (UI) that may be generated by the TPRM data hub for accessing the hub's data including the 3PIN-based or linked data.

FIG. 16 illustrates a screen shot 1610 of an exemplary external UI that may be generated by the TPRM data hub for accessing (e.g., via a user's interaction with a client device) TPRM data hub's data including the 3PIN-based or linked data. Particularly, the screen shot 1610 shows a UI view of an entity hierarchy 1620 with products aggregated by service categories with linkages to the entity's hierarchy, and linkages and the hierarchy provided by the TPRM data hub maintaining and linking/mapping of the 3PIN registration data. In the entity hierarchy 1620, a box 1622 is shown for the overarching or parent third party/company 1622 with its entity ID 1623. Below this entity/third party 1622, a number of subsidiaries or portions of the third party identified with entity ID 1623 are shown with boxes 1630, 1635 (and each of these has its own entity ID). In the entity hierarchy 1620, a number of products/services are shown with boxes 1640, 1642, 1644, 1646, and 1648 with each having a unique 3PIN as shown with 3PIN 1641 for product 1640. Each of these products 1640, 1642, 1644, 1646, 1648 is assigned to a service category 1632, 1634, and 1636, which, in turn, is associated or linked with one of the subsidiaries/portions 1630, 1635 of the third party/entity 1622.

Figure 17:
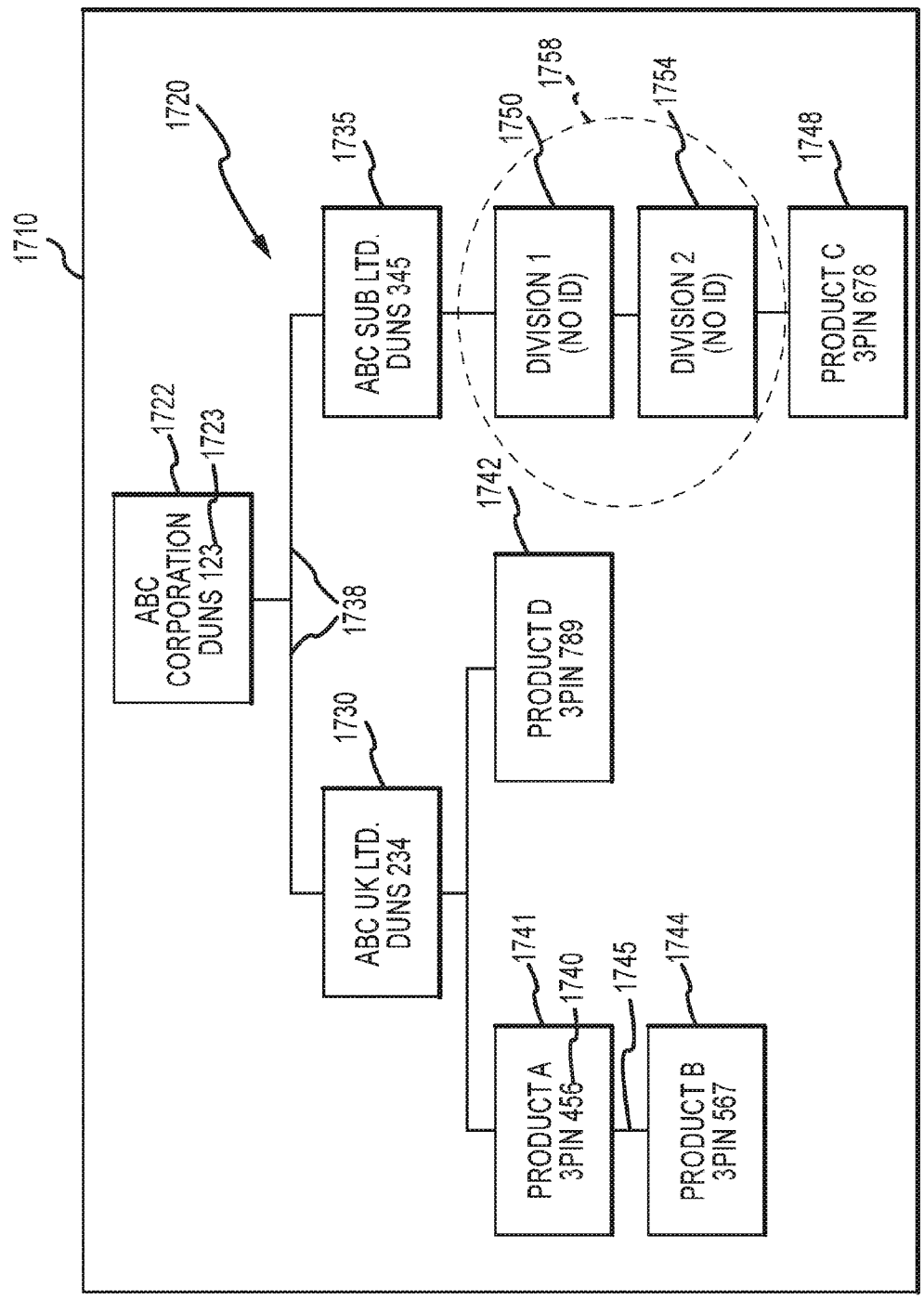
FIG. 17 illustrates a screen shot of another exemplary external UI that may be generated by the TPRM data hub for accessing the 3PIN dataset created and maintained by the TPRM data hub.

FIG. 17 illustrates a screen shot 1710 of another exemplary external UI that may be generated by the TPRM data hub for accessing the 3PIN dataset created and maintained by the TPRM data hub. The UI view 1710 shows entity hierarchy also product hierarchy and division relationships. Particularly, a third party or entity is shown with box 1722 along with its entity ID 1723. Subsidiary linkages 1738 are shown below the third party box 1722 to subsidiary/third party portions 1730, 1735 (with each also having their own entity ID). In the hierarchy 1720, three products 1740, 1742 and 1744 are shown to be linked to the subsidiary 1730 of third party/entity 1722 (with each having its own 3PIN as shown for product 1740 at 1741). A product hierarchy is shown in UI of screen shot 1710 as shown with linkage 1745 linking the product 1744 to its parent product 1740. In the hierarchy 1720, product 1748 is shown to be linked or mapped to the subsidiary 1735, but the hierarchy 1720 also includes divisions 1750, 1754 (which may not be provided with their own 3PIN) between the subsidiary 1735 and the product 1748, with the relationship between the divisions 1750 and 1754 shown in the dashed circle 1758 of UI 1710.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As discussed above, one purpose of the protocol or standard questionnaire(s) is that it provides a cost and time efficient approach for firms ("contracting entities" such as banks) to "sign up" to an agreed to standard questionnaire. It also allows other relevant parties, including banks, to be aware of the availability of the standard questionnaire as a way to provide and process third party risk management information. Banks/contracting entities can request that their third parties fill out the standard questionnaire such as via an easy to use GUI or the third parties can proactively request to fill out the questionnaire and be "pre-certified" by the TPRM data hub as far as completing a standard questionnaire is concerned. As long as the standard questionnaire is completed by third parties, efficiencies (e.g., time and cost for questionnaire completion) will then only be driven by completion of delta questions presented by one or more of the banks/contracting entities. Bank-specific questionnaires can be created from the standard questionnaire and continued workflow functionality can be built upon third party answers.

Embodiments of the subject matter described in this specification can be implemented as one or more computer program products, i.e., one or more modules of computer program instructions encoded on a computer-readable medium for execution by, or to control the operation of, data processing apparatus. For example, the modules/software used to provide the third party risk management data hub system and its engines, modules, programs, and the like (and similar modules/software) may be provided in such computer-readable medium and executed by processor(s) on one or more servers linked to client or user devices (e.g., computing devices operated by contracting entities (e.g., bank employees) and third parties (e.g., third party employees viewing user interfaces or fillable forms/vendor questionnaires). The computer-readable medium can be a machine-readable storage device, a machine-readable storage substrate, a memory device, a composition of matter affecting a machine-readable propagated signal, or a combination of one or more of these types of media.

The terms "client device" and "third party risk management data hub system" encompass all apparatus, devices, and machines for processing data including, e.g., a programmable processor, a computer, or multiple processors or computers. The system (such as devices and servers in system 100 of FIG. 1) can include, in addition to hardware, code that creates an execution environment for the computer program, e.g., code that constitutes processor firmware, a protocol stack, a database management system, an operating system, or a combination of one or more of these items. For example, the third party risk management data hub typically will be provided on a central server(s) and use a database management system to provide one or more databases storing the third parties' answers to third party due diligence questionnaires, and this central server typically will also include GUI generators and/or web site management tools to facilitate access by the contracting parties' and third parties' client devices to the databases. Further, memory will be provided for storing the protocol/standard third party questionnaires (e.g., for each type of service/product or tier or level of criticality of service/product) and also the delta questions or questionnaires for each third party.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry. Processors suitable for the execution of a computer program include, e.g., both general and special purpose microprocessors, and any one or more processors of any kind of digital computer. Generally, a processor receives instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 1 is a block diagram illustrating one embodiment of a computer system configured to implement the methods described herein such as with reference to the other included figures. In different embodiments, the computer system 100 with its client devices and third party risk management centralized data hub may be any of various types of devices including, but not limited to, a personal computer system, desktop computer, laptop computer, notebook computer, netbook computer, mainframe computer system, handheld computer, workstation, network computer, application server, storage device, a consumer electronics device (e.g., camera, camcorder, set top box, mobile device, video game console, handheld video game device, etc.), a peripheral device (e.g., switch, modem, router, etc.), or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, etc. Computer-readable media suitable for storing computer program instructions and data include all forms of non-volatile memory, media and memory devices, including, e.g., semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user (with an I/O portion of a client device or server device), embodiments of the subject matter described in this specification can be implemented on a computer having a display device, e.g., LCD (liquid crystal display) or LED (light emitting diode) monitor, for the computer to display information to the user; and a keyboard and a pointing device, e.g., a mouse or a trackball, for the user to provide input to the computer. Other types of devices can be used to provide for interaction with a user as well, e.g., feedback provided to the user can be any form of sensory feedback, e.g., visual feedback, auditory feedback, or tactile feedback; and input from the user can be received in any form, including acoustic, speech, or tactile input such as may be useful for providing telephony communications with telephony I/O or similar forms.

Similarly, while operations are depicted in the drawings in a particular order, this depiction should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The invention claimed is:

1. A system for providing a third party centralized data hub, comprising:
    a server storing a database of sets of third party data;
    a third party risk management module provided on the server maintaining and controlling access to the database of the sets of third party data;
    a first set of client devices communicatively linked with the server over a digital communications network and operable by data providers to provide and modify one of the sets of third party data via the digital communications network; and
    a second set of client devices communicatively linked with the server over the digital communications network and operable by a plurality of data consumers to access a subset of the sets of third party data,
    wherein the third party risk management module monitors the sets of the third party data, identifies a modification, by one of the data providers, of one of the sets of third party data in the subset of the sets of third party data, and, when the modification is identified, automatically generates and transmits an alert, based on the modification, to the second set of client devices operable by the data consumers.

2. The system of claim 1, wherein the alert includes a portion of the modified one of the sets of third party data including the modification.

3. The system of claim 1, wherein each of the sets of third party data includes data entries associated with a set of data fields common to all of the sets of third party data.

4. The system of claim 3, wherein the modification comprises a change to one of the data entries for one of the data fields.

5. The system of claim 3, wherein the set of data fields are data entry fields of a third party due diligence questionnaire.

6. The system of claim 5, wherein the third party risk management module receives a data input request from one of the data consumers and, in response, updates the third party due diligence questionnaire to include a data field associated with the data input request.

7. The system of claim 5, wherein the third party risk management module performs a risk assessment by processing the data entries and, when a predefined change in results of the risk assessment are identified for one of the data providers, automatically generating a risk alert that is transmitted over the digital communications network to the second set of client devices operable by the data consumers.

8. The system of claim 1, wherein the subset of the sets of third party data accessed by each of the data consumers differs for at least some of the data consumers and is defined by the third party risk management module based on user input provided from each of the data consumers via operation of the second set of client devices.

9. A system for providing a third party centralized data hub, comprising:
    a server storing a database of sets of third party data;
    a third party risk management module provided on the server maintaining and controlling access to the database of the sets of third party data;
    a first set of client devices communicatively linked with the server over a digital communications network and operable by data providers to provide and modify one of the sets of third party data via the digital communications network; and
    a second set of client devices communicatively linked with the server over the digital communications network and operable by a plurality of data consumers to access a subset of the sets of third party data,
    wherein the third party risk management module monitors the sets of the third party data, identifies a modification, by one of the data providers, of one of the sets of third party data in the subset of the sets of third party data,
    wherein each of the sets of third party data includes data entries associated with a set of data fields common to all of the sets of third party data,
    wherein the set of data fields are data entry fields of a third party due diligence questionnaire, and
    wherein the third party risk management module performs a risk assessment by processing the data entries and, when a predefined change in results of the risk assessment are identified for one of the data providers, generating a risk alert that is transmitted over the digital communications network to the second set of client devices operable by the data consumers.

10. The system of claim 9, wherein the modification comprises a change to one of the data entries for one of the data fields.

11. The system of claim 10, wherein, when the modification is identified, the third party risk management module generates and transmits an alert, based on the modification, to the second set of client devices operable by the data consumers.

12. The system of claim 9, wherein the third party risk management module receives a data input request from one of the data consumers and, in response, updates the third party due diligence questionnaire to include a data field associated with the data input request.

13. The system of claim 9, wherein the subset of the sets of third party data accessed by each of the data consumers differs for at least some of the data consumers and is defined by the third party risk management module based on user input provided from each of the data consumers via operation of the second set of client devices.

\* \* \* \* \*